US012071305B2

(12) United States Patent
Austrheim et al.

(10) Patent No.: US 12,071,305 B2
(45) Date of Patent: Aug. 27, 2024

(54) MOBILE STORAGE SYSTEM

(71) Applicant: Autostore Technology AS, Nedre Vats (NO)

(72) Inventors: Trond Austrheim, Etne (NO); Kjetil Velde, Forresfjorden (NO); Synnove Solberg Matre, Sandeid (NO); Ragnar Stuhaug, Skjold (NO)

(73) Assignee: AutoStore Technology AS, Nedre Vats (NO)

( * ) Notice: Subject to any disclaimer, the term of this patent is extended or adjusted under 35 U.S.C. 154(b) by 593 days.

(21) Appl. No.: 17/283,261

(22) PCT Filed: Sep. 23, 2019

(86) PCT No.: PCT/EP2019/075454
§ 371 (c)(1),
(2) Date: Apr. 7, 2021

(87) PCT Pub. No.: WO2020/074242
PCT Pub. Date: Apr. 16, 2020

(65) Prior Publication Data
US 2021/0380339 A1 Dec. 9, 2021

(30) Foreign Application Priority Data
Oct. 12, 2018 (NO) .................................. 20181309

(51) Int. Cl.
*B65G 1/137* (2006.01)
*B65D 88/02* (2006.01)
(Continued)

(52) U.S. Cl.
CPC ........... *B65G 1/137* (2013.01); *B65D 88/022* (2013.01); *B65D 88/121* (2013.01); *B65D 90/0006* (2013.01); *B65G 1/0464* (2013.01)

(58) Field of Classification Search
USPC ....................................................... 414/679
See application file for complete search history.

(56) References Cited

U.S. PATENT DOCUMENTS 3,833,280 A * 9/1974 Bell ....................... G06K 13/14
312/107
3,907,147 A 9/1975 Goobeck
(Continued)

FOREIGN PATENT DOCUMENTS

CN 104781163 A 7/2015
CN 105905461 Y 8/2016
(Continued)

OTHER PUBLICATIONS

Machine translation of EP 3115319 from espacenet. (Year: 2015).*
(Continued)

*Primary Examiner* — Mark C Hageman
(74) *Attorney, Agent, or Firm* — Baker Botts L.L.P.

(57) ABSTRACT

The invention relates to a mobile storage system having a mobile container with an automated storage and retrieval system arranged inside. The automated storage and retrieval system has a storage grid structure having vertical members defining multiple columns, such as storage columns for storing storage bins on top of each other in vertical stacks. The vertical members are interconnected at their upper ends by a first rail system arranged to guide at least one bin handling vehicle thereon. The bin handling vehicle is configured to raise storage bins from, and lower storage bins into, the storage columns, and to transport the storage bins above the storage columns. The invention also relates to a method for providing such a system. The invention also relates to a mobile storage system having a plurality of mobile containers connected together and a method for providing such a system.

31 Claims, 19 Drawing Sheets

(51) Int. Cl.
    *B65D 88/12*    (2006.01)
    *B65D 90/00*    (2006.01)
    *B65G 1/04*     (2006.01)

(56) References Cited

U.S. PATENT DOCUMENTS

| | | | |
|---|---|---|---|
| 4,599,829 | A | 7/1986 | Dimartino, Sr. |
| 4,610,215 | A | 9/1986 | Robishaw et al. |
| 6,363,586 | B1 | 4/2002 | Neufingerl |
| 9,567,168 | B1 | 2/2017 | Tibbens et al. |
| 9,821,959 | B2 * | 11/2017 | Hognaland ............ B60L 15/40 |
| 10,189,641 | B2 | 1/2019 | Hognaland |
| 10,819,126 | B2 * | 10/2020 | Hognaland ........... H02J 7/0013 |
| 11,383,388 | B2 * | 7/2022 | Väin .................... B65G 1/0407 |
| 11,440,752 | B2 * | 9/2022 | Eidsmore ................ B60P 1/02 |
| 2001/0038009 | A1 | 11/2001 | Payne |
| 2011/0313811 | A1 * | 12/2011 | Urban ................ G06Q 20/203 |
| | | | 296/24.3 |
| 2013/0068638 | A1 * | 3/2013 | Ho .......................... B65G 1/00 |
| | | | 206/216 |
| 2018/0265296 | A1 | 9/2018 | Beckman et al. |
| 2020/0071098 | A1 * | 3/2020 | Juscius ................. B65G 67/24 |
| 2021/0179364 | A1 * | 6/2021 | Zhang ................. B65G 1/0464 |

FOREIGN PATENT DOCUMENTS

| | | |
|---|---|---|
| CN | 108367862 A | 8/2018 |
| EP | 1167235 A | 1/2002 |
| EP | 1167235 A2 | 1/2002 |
| EP | 3 115 319 A1 | 1/2017 |
| EP | 3115319 Y | 1/2017 |
| FR | 3018788 Y | 9/2015 |
| JP | S61-49003 A | 3/1986 |
| JP | H10-511764 A | 11/1998 |
| JP | 2014-218323 A | 11/2014 |
| WO | 96/08681 A1 | 3/1996 |
| WO | WO01/23261 Y | 4/2001 |
| WO | 317366 B1 | 10/2004 |
| WO | WO2010/149985 A | 12/2010 |
| WO | WO2011/115674 A | 9/2011 |
| WO | 2014/075937 A1 | 5/2014 |
| WO | WO2014/066844 Y | 5/2014 |
| WO | 2014/090684 A1 | 6/2014 |
| WO | 2015/104263 A2 | 7/2015 |
| WO | 2015/193278 A1 | 12/2015 |
| WO | WO2016/166294 A | 10/2016 |
| WO | WO2016/166294 Y | 10/2016 |
| WO | 2017/211634 A1 | 12/2017 |
| WO | 2017-220627 A1 | 12/2017 |
| WO | WO2017/220627 Y | 12/2017 |
| WO | 2018/033426 A1 | 2/2018 |

OTHER PUBLICATIONS

Office Action issued in the counterpart Chinese Patent Application No. 201980066180.4, mailed on Feb. 10, 2022 (11 pages).
Office Action issued in the counterpart Chinese Patent Application No. 201980066180.4, mailed on Jul. 20, 2022 (12 pages).
ISRWOISA dated Jan. 7, 2020.
Search Report of Norwegian Industrial Property office dated May 8, 2019.
Office Action issued in counterpart Japanese Patent Application No. 2021-519566 mailed on Jul. 20, 2023 (12 pages).

* cited by examiner

MOBILE STORAGE SYSTEM

TECHNICAL FIELD

The present invention relates to a mobile storage system comprising at least one mobile container having an automated storage and retrieval system for storage and retrieval of storage bins.

BACKGROUND AND PRIOR ART

A mobile container such as an intermodal container or shipping container is a container for storage of goods that can be transported by e.g. train, ship, plane and truck and further which can be used across these different means of transport.

Intermodal containers are used worldwide to store and transport goods efficiently and securely around the world. They are often referred to by different names, such as cargo container, ISO container and shipping container.

Intermodal containers occur in many different standardized sizes and are often made of steel or aluminum. The dimensions of an intermodal container may vary from 2.4 to 17.1 m in length, from 2.2 to 2.5 m in width and from 2.2 to 2.9 m in height.

Table 1 shows examples of dimensions and net loads of some of the most common standardized types of intermodal containers.

TABLE 1

Dimensions and net loads of intermodal containers.

|  |  | 20' container | 40' container | 45' high-cube containers |
|---|---|---|---|---|
| External dimensions | length | ~6.1 m | ~12.2 m | ~13.7 m |
|  | width | ~2.4 m | ~2.4 m | ~2.4 m |
|  | height | ~2.6 m | ~2.6 m | ~2.9 m |
| Interior dimensions | length | ~5.9 m | ~12.0 m | ~13.6 m |
|  | width | ~2.4 m | ~2.4 m | ~2.4 m |
|  | height | ~2.4 m | ~2.4 m | ~2.7 m |
| Door opening | width | ~2.3 m | ~2.3 m | ~2.3 m |
|  | height | ~2.3 m | ~2.3 m | ~2.6 m |
| Internal volume |  | ~33.1 m$^3$ | ~67.5 m$^3$ | ~86.1 m$^3$ |
| Net load |  | ~28,200 kg | ~26,200 kg | ~25,600 kg |

The intermodal containers can bundle cargo and goods into larger, unitized loads, that can be easily handled, moved, and stacked, and that will pack tightly in a ship or yard. Intermodal containers share a number of construction features to withstand the stresses of intermodal shipping, to facilitate their handling and to allow stacking. Further, they may be identifiable through individual unique ISO 6346 reporting marks.

An automated storage and retrieval system that comprises a grid storage system is known in the art.

FIG. 1 discloses a typical prior art automated storage and retrieval system 1 with a framework structure 100 and FIGS. 2 and 3 disclose two different prior art bin handling vehicles 201, 301 suitable for operating on such a system 1.

The framework structure 100 comprises a number of upright members/vertical members 102 and a number of horizontal members 103 which can be supported by the vertical members 102 and/or be arranged at the base of the framework structure 100 (not shown). When the horizontal members 103 are arranged at the base of the framework structure 100, they may be arranged in a grid pattern supporting the vertical members 102. The members 102, 103 may typically be made of metal, e.g. extruded aluminum profiles.

The framework structure 100 defines a storage grid structure 104 comprising storage columns 105 arranged in rows. In these storage columns 105, storage bins 106 (also known as storage containers) are stacked one on top of another to form stacks 107. The storage grid structure 104 guards against horizontal movement of the stacks 107 of storage bins 106, and guides vertical movement of the bins 106, but normally does not otherwise support the storage bins 106 when they are stacked.

The automated storage and retrieval system 1 comprises a rail system 108 arranged in a grid pattern across the top of the storage grid structure 104, on which rail system 108 a plurality of bin handling vehicles 201, 301 are operated to raise storage bins 106 from, and lower storage bins 106 into, the storage columns 105, and also to transport the storage bins 106 above the storage columns 105. The rail system 108 comprises a first set of parallel rails 110 arranged to guide movement of the bin handling vehicles 201, 301 in a first direction X across the top of the frame structure 100, and a second set of parallel rails 111 arranged perpendicular to the first set of rails 110 to guide movement of the bin handling vehicles 201, 301 in a second direction Y which is perpendicular to the first direction X. In this way, the rail system 108 defines grid columns 112 above which the bin handling vehicles 201, 301 can move laterally above the storage columns 105, i.e. in a plane which is parallel to the horizontal X-Y plane.

Each prior art bin handling vehicle 201, 301 comprises a vehicle body 201a, 301a, and first and second sets of wheels 201b, 301b, 201c, 301c which enable the lateral movement of the bin handling vehicles 201, 301 in the X direction and in the Y direction, respectively. In FIGS. 2 and 3 two wheels in each set are fully visible. The first set of wheels 201b, 301b is arranged to engage with two adjacent rails of the first set of rails 110, and the second set of wheels 201c, 301c is arranged to engage with two adjacent rails of the second set of rails 111. Each set of wheels 201b, 301b 201c, 301c can be lifted and lowered, so that the first set of wheels 201b, 301b and/or the second set of wheels 201c, 301c can be engaged with the respective set of rails 110, 111 at any one time.

Each prior art bin handling vehicle 201, 301 also comprises a lifting device (not shown) for vertical transportation of storage bins 106, e.g. raising a storage bin 106 from, and lowering a storage bin 106 into, a storage column 105. The lifting device comprises one or more gripping/engaging devices 303 which are adapted to engage a storage bin 106. The gripping/engaging devices 303 can be lowered from the vehicle 201, 301 so that the position of the gripping/engaging devices 303 with respect to the vehicle 201, 301 can be adjusted in a third direction Z which is orthogonal to the first direction X and the second direction Y. Further details with regard to the lifting device are described in e.g. WO 2017/211634 A1, the contents of which are incorporated herein by reference.

Conventionally, and also for the purpose of this application, Z=1 identifies the uppermost layer of the storage grid structure 104, i.e. the layer immediately below the rail system 108, Z=2 the second layer below the rail system 108, Z=3 the third layer below the rail system 108 etc. In the exemplary prior art storage grid structure disclosed in FIG. 1, Z=8 identifies the lowermost, bottom layer of the storage grid structure 104. Similarly, X=1 ... n and Y=1 ... n identifies the position of each grid column 112 in the horizontal plane. Consequently, as an example, and using the Cartesian coordinate system X, Y, Z indicated in FIG. 1, the storage bin identified as 106' in FIG. 1 can be said to occupy grid location or cell X=10, Y=2, Z=3. The bin handling vehicles 201, 301 can be said to travel in layer Z=0, and each grid column 112 can be identified by its X and Y coordinates.

Each prior art bin handling vehicle 201, 301 comprises a storage compartment or space for receiving and stowing a storage bin 106 when transporting the storage bin 106 across the rail system 108. The storage space may comprise a cavity arranged centrally within the vehicle body 201a as shown in FIG. 2 and as described in e.g. WO 2015/193278 A1 and WO 2018/033426 A1, the contents of which are incorporated herein by reference.

FIG. 3 shows an alternative configuration of a bin handling vehicles 301 with a cantilever construction. Such a vehicle is described in detail in e.g. NO317366, the contents of which are also incorporated herein by reference.

The central cavity bin handling vehicles 201 shown in FIG. 2 may have a footprint that covers an area with dimensions in the X and Y directions which is generally equal to the lateral extent of a grid column 112, i.e. the extent of a grid column 112 in the X and Y directions, e.g. as is described in WO 2015/193278 A1, the contents of which are incorporated herein by reference. The term 'lateral' used herein may mean 'horizontal'.

Alternatively, the central cavity bin handling vehicles 201 may have a footprint which is larger than the lateral area defined by a grid column 112, e.g. as is disclosed in WO 2014/090684 A1.

The rail system 108 may be a single rail system, as is shown in FIG. 4. Alternatively, the rail system 108 may be a double rail system, as is shown in FIG. 5, thus allowing a bin handling vehicle 201 having a footprint generally corresponding to the lateral area defined by a grid column 112 to travel along a row of grid columns even if another bin handling vehicle 201 is positioned above a grid column neighboring that row. Both the single and double rail system, or a combination comprising a single and double rail arrangement in a single rail system 108, form a grid pattern in the horizontal plane P comprising a plurality of rectangular and uniform grid locations or grid cells 122, where each grid cell 122 comprises a grid opening 115 being delimited by a pair of rails 110a, 110b of the first set of rails 110 and a pair of rails 11a, 1/1b of the second set of rails 111. In FIG. 5 the grid cell 122 is indicated by a dashed box.

Consequently, rails 110a and 110b form pairs of rails defining parallel rows of grid cells running in the X direction, and rails 111a and 111b form pairs of rails defining parallel rows of grid cells running in the Y direction.

As shown in FIG. 6, each grid cell 122 has a width $W_c$ which is typically within the interval of 30 to 150 cm, and a length $L_c$ which is typically within the interval of 50 to 200 cm. Each grid opening 115 has a width $W_o$ which is typically 2 to 10 cm less than the width $W_c$ of the grid cell 122. Each grid opening 115 has a length $L_o$ which is typically 2 to 10 cm less than the length $L_c$ of the grid cell 122.

In the X and Y directions, neighbouring grid cells are arranged in contact with each other such that there is no space between neighbouring grid cells.

In a storage grid structure 104, a majority of the grid columns 112 are storage columns 105, i.e. grid columns 105 where storage bins 106 are stored in stacks 107. However, a storage grid structure 104 normally has at least one grid column 112 which is not used for storing storage bins 106, but which comprises a location where the bin handling vehicles 201, 301 can drop off and/or pick up storage bins 106 so that they can be transported to an access station (not shown) where the storage bins 106 can be accessed from outside of the storage grid structure 104 or transferred out of or into the storage grid structure 104. Within the art, such a location is normally referred to as a 'port' and the grid column 112 in which the port is located may be referred to as a 'port column' 119, 120. The transportation to the access station may be in any direction, that is horizontal, tilted and/or vertical. For example, the storage bins 106 may be placed in a random or dedicated grid column 112 within the storage grid structure 104, then picked up by any bin handling vehicle and transported to a port 119, 120 for further transportation to an access station. Note that the term 'tilted' means transportation of storage bins 106 having a general transportation orientation somewhere between horizontal and vertical.

The storage grid structure 104 in FIG. 1 comprises two port columns 119 and 120. The first port column 119 may for example be a dedicated drop-off port column where the bin handling vehicles 201, 301 can drop off storage bins 106 to be transported to an access station or a transfer station, and the second port column 120 may be a dedicated pick-up port column where the bin handling vehicles 201, 301 can pick up storage bins 106 that have been transported to the storage grid structure 104 from an access station or a transfer station.

The access station may typically be a picking station or a stocking station where product items are removed from or positioned into the storage bins 106. In a picking station or a stocking station, the storage bins 106 are normally never removed from the automated storage and retrieval system 1, but are returned into the storage grid structure 104 once accessed. A port 119, 120 can also be used for transferring storage bins out of or into the grid 104, e.g. for transferring storage bins 106 to another storage facility (e.g. to another grid or to another automated storage and retrieval system), to a transport vehicle (e.g. a train or a lorry), or to a production facility.

A conveyor system comprising conveyors is normally employed to transport the storage bins between the ports 119, 120 and the access station.

If the ports 119, 120 and the access station are located at different levels, the conveyor system may comprise a lift device with a vertical component for transporting the storage bins 106 vertically between the port 119, 120 and the access station.

The conveyor system may be arranged to transfer storage bins 106 between different grids, e.g. as is described in WO 2014/075937 A1, the contents of which are incorporated herein by reference.

When a storage bin 106 stored in the grid 104 disclosed in FIG. 1 is to be accessed, one of the bin handling vehicles 201, 301 is instructed to retrieve the target storage bin 106 from its position in the storage grid structure 104 and transport it to the drop-off port 119. This operation involves moving the bin handling vehicle 201, 301 to a grid location above the storage column 105 in which the target storage bin 106 is positioned, retrieving the storage bin 106 from the storage column 105 using the bin handling vehicle's 201, 301 lifting device (not shown), and transporting the storage bin 106 to the drop-off port 119. If the target storage bin 106 is located deep within a stack 107, i.e. with one or a plurality of other storage bins 106 positioned above the target storage bin 106, the operation also involves temporarily moving the above-positioned storage bins prior to lifting the target storage bin 106 from the storage column 105. This step, which is sometimes referred to within the art as "digging", may be performed with the same bin handling vehicle 201, 301 that is subsequently used for transporting the target storage bin 106 to the drop-off port 119, or with one or a plurality of other cooperating bin handling vehicles 201, 301. Alternatively, or in addition, the automated storage and retrieval system 1 may have bin handling vehicles 201, 301 specifically dedicated to the task of temporarily removing storage bins 106 from a storage column 105. Once the target storage bin 106 has been removed from the storage column 105, the temporarily removed storage bins 106 can be repositioned into the original storage column 105. However, the removed storage bins 106 may alternatively be relocated to other storage columns 105.

When a storage bin 106 is to be stored in the storage grid structure 104, one of the bin handling vehicles 201, 301 is instructed to pick up the storage bin 106 from the pick-up port 120 and transport it to a grid location above the storage column 105 where it is to be stored. After any storage bins positioned at or above the target position within the storage column stack 107 have been removed, the bin handling vehicle 201, 301 positions the storage bin 106 at the desired position. The removed storage bins 106 may then be lowered back into the storage column 105 or relocated to other storage columns 105.

The automated storage and retrieval system 1 comprises a control system for monitoring and controlling the automated storage and retrieval system 1, e.g. for monitoring and controlling the location of respective storage bins 106 within the storage grid structure 104, monitoring the content of each storage bin 106, and monitoring and controlling the movement of the bin handling vehicles 201, 301 so that a desired storage bin 106 can be delivered to the desired location at the desired time without the bin handling vehicles 201, 301 colliding with each other. The control system is typically computerized and typically comprises a database for keeping track of the storage bins 106.

The automated storage and retrieval system 1 may comprise bin handling vehicles, charging station(s) for charging the bin handling vehicles and a wireless communication system. Such features are also known from WO 2015/104263 A1, which is incorporated herein by reference.

A bin lift device for transporting bins in a vertical direction from a storage grid structure 104 placed underneath another storage grid structure 104 is known from WO 2014/075937 A1, which is incorporated herein by reference.

An objective of the present invention is to provide a mobile storage system for placing an automated storage and retrieval system where needed.

SUMMARY OF THE INVENTION

At least preferred embodiments of the present invention provide a mobile storage system for placing an automated storage and retrieval system where needed, e.g. at a construction site, temporary storage area, field-hospital, military camp, temporary sales outlet, etc.

At least preferred embodiments of the present invention provide a mobile storage system that is easy to install for operation.

At least preferred embodiments of the present invention provide a flexible mobile storage system where containers can easily be exchanged.

At least preferred embodiments of the present invention provide a flexible mobile storage system where containers can be easily added to or removed from said system.

At least preferred embodiments of the present invention provide accurate alignment between grid structures in adjacent mobile containers.

The present invention is set forth and characterized in the independent claims, while the dependent claims describe preferred or optional features of the invention.

The mobile storage system may comprise a plurality of mobile containers, each container having an automated storage and retrieval system for storing storage bins (wherein the bins may contain items). One of the mobile containers may be a so-called master container having storage columns and dedicated columns for receiving storage bins from an access station and delivering storage bins to an access station. The remaining mobile containers may be so-called supply containers comprising an automated storage and retrieval system without dedicated columns for receiving storage bins from the access station and delivering storage bins to the access station. Within the system the master container may be connected to at least one supply container such that a bin handling vehicle can move from the storage grid structure of the master container to a storage grid structure of the supply container. Further, the master container and/or supply container may be connected to a plurality of supply containers, which again can be connected to a plurality of supply containers and so on. Thus, the size of the mobile storage system can be customized according to need. Further, the mobile storage system may provide a flexible system where a mobile container arranged at any end of a side-by-side mobile container arrangement can be replaced by another mobile container.

The framework structure of the automated storage and retrieval system according to embodiments of the present invention may be constructed in accordance with the prior art framework structure described above in connection with FIGS. 1-6, i.e. such a framework structure may comprise a number of vertical members and a number of horizontal members. As in the prior art, the automated storage and retrieval system may comprise a rail system including a first set of parallel rails in the X direction and a second set of parallel rails in the Y direction arranged across the top of storage columns defined by the framework structure/grid columns defined by the two sets of rails.

A first embodiment of the present invention relates to a mobile storage system comprising a first mobile container having a first automated storage and retrieval system arranged inside. The first automated storage and retrieval system comprises a first storage grid structure having vertical members defining multiple columns, such as storage columns for storing storage bins on top of each other in vertical stacks. The vertical members are interconnected at their upper ends by a first rail system arranged to guide at least one bin handling vehicle thereon. The bin handling vehicle is configured to raise storage bins from, and lower storage bins into, the storage columns, and to transport the storage bins above the storage columns.

The first mobile container may further comprise a first container frame having base panel, a top panel and four vertically extending profiles extending from each corner of the base panel connecting the base panel and the top panel.

The first mobile container may comprise two long end side panels and two short end side panels. At least a part of at least one side panel may be removable.

The side panels may be fixed (for example, removably fixed) to the vertically extending profiles (i.e. each side panel may be connected to two vertically extending profiles). The side panels may also be fixed (for example, removably fixed) to the top panel and bottom panel.

In embodiments where the first mobile container is a standalone unit (i.e. not connected to any other mobile containers), the removable part of the at least one side panel may form a doorway or similar opening for human access into the first mobile container.

In embodiments in which the first mobile container is going to be connected with another mobile container, for the purpose of connecting two or more automated storage and retrieval systems together, the removable part of the at least one side panel may form an access opening for allowing connection between the first automated storage and retrieval system in the first mobile container, and a second automated storage and retrieval system in the second mobile container.

In particular, when at least a part of the side panel is removed it may create an opening which should be at least the size of the maximum cross section of a bin handling vehicle carrying a bin (taken in a vertical plane perpendicular to the axis of movement of the bin handling vehicle when moving through the opening, said vertical plane being parallel to the plane of the side panel in which the opening is formed) moving on the rail system.

Moreover, the opening should of course be located accordingly, i.e. positioned such that the bin handling vehicle can move from the rail system of one mobile container on to the rail system of another mobile container. That is, the opening may have a vertical extent extending at least from just below the horizontal plane of the rail system, upwards at least to the height of the bin handling vehicle carrying a bin on the rails. The opening may extend vertically below, and/or vertically above such an opening.

Of course, the opening may be larger than the size of the maximum cross section of a bin handling vehicle carrying a bin moving on the rail system. For example, the opening may have a height that is at least the height of a bin handling vehicle carrying a bin moving on the rail system, but the width may extend across substantially the entire side at which the two containers are to be connected. The opening may be created by removal of a panel, in which case the opening is of course substantially the size of the removed panel.

The first mobile container may include at least two openings; a first, allowing human access into the first mobile container (for example, a doorway), and a second allowing connection between the first automated storage and retrieval system in the first mobile container, and a second automated storage and retrieval system in the second mobile container (and in particular, allowing a bin handling vehicle carrying a bin to move from the rails of the first automated storage and retrieval system in the first mobile container, onto the rails of the second automated storage and retrieval system in the second mobile container). The first mobile container may include openings on one, two, three or four of its four side panels.

When connecting two mobile containers in a side-by-side arrangement along the long end side, at least a part of the long end side panel is removable for making the opening. In another exemplary embodiment the whole long end side panel can be removed. This can be advantageous to allow connection of the rail systems of the two mobile containers, after the two mobile containers have been connected. The rail systems may be connected in order to allow a bin handling vehicle to move from one storage and retrieval system to the other.

When connecting two mobile containers in a side-by-side arrangement along their short end sides, at least a part of their respective short end side panels (at the short end side where the two mobile containers are connected) is removable for making the opening.

In another exemplary embodiment the whole short end side panel (at the short end side where the two mobile containers are connected) can be removed.

In yet another exemplary embodiment both the short end side panel and the long end side panel comprise at least a part which is removable for creating openings which should be at least the size of the maximum cross section of a bin handling vehicle carrying a bin moving on the rail system. Moreover, the openings should of course be located accordingly, i.e. positioned such that the bin handling vehicle can move from the rail system of one mobile container on to the rail system of another mobile container.

To enable access to the storage bins from the outside of the first storage grid structure, at least one of the columns in the first storage and retrieval system can be dedicated for drop off and/or pick of storage bins by the bin handling vehicle. Further, at least one access station can be arranged adjacent to the at least one dedicated column where an operator can have access to withdraw items from the storage bins and/or have access to supply items into the storage bins. At the access station the storage bins can be accessed from outside of the first storage grid structure or transferred out of or into the at least one column of the first storage grid structure dedicated for drop off and/or pick of storage bins.

The dedicated column may be an integral part of the first storage grid structure.

A first mobile container having storage bins that can be accessed by an operator can be considered to be the master container if more containers are connected thereto.

The first automated storage and retrieval system of the first mobile container may further comprise at least one charging station for charging the bin handling vehicle, said charging station being arranged at or on the rail system. The number of charging stations can be adjusted according to the number of vehicles operating within the system.

Further, the first automated storage and retrieval system can have a controller for storing, receiving and/or transferring data regarding the items stored in the storage bins and the position of the storage bins. This way the system can be monitored with regard to where each stored item and/or bin is and how many of each item is stored in the system.

In another embodiment of the invention, the first mobile container may have height adjustable feet fixed to an outer lower surface of the first mobile container, thereby allowing height adjustment and/or levelling of the first mobile container. As will be explained in detail in the detailed description levelling is especially important when connecting two mobile containers together for the purpose of connecting two or more automated storage and retrieval systems together, because the rail systems that are to be connected together from each mobile container should be connected together with high precision and accuracy.

The mobile storage system may further comprise a second mobile container configured to removably connect to the first mobile container. A second automated storage and retrieval system is arranged within the second mobile container. The second automated storage and retrieval system comprises a second storage grid structure having vertical members defining multiple storage columns for storing storage bins on top of each other in vertical stacks. The vertical members are interconnected at their upper ends by a second rail system arranged to guide at least one bin handling vehicle thereon. The bin handling vehicle is configured to raise storage bins from, and lower storage bins into the storage columns, and to transport the storage bins above the storage columns.

The second mobile container may further comprise a second container frame having a base panel, a top panel and four vertically extending profiles extending from each corner of the base panel to connect the base panel and the top panel.

At least one of the base panel, top panel and vertically extending profiles of both the first and second mobile container may have cuboidal shapes in which holes are provided, the holes being for receiving a connecting element when connecting the two mobile containers together.

The second container frame may further comprise two long end side panels and two short end side panels wherein at least a part of one of the side panels is removable (to form an opening into the second container).

The side panels may be fixed (for example, removably fixed) to the vertically extending profiles (i.e. each side panel may be connected to two vertically extending profiles). The side panels may also be fixed (for example, removably fixed) to the top panel and bottom panel.

In general, the second container may be referred to as a "supply container". A supply container is distinguished from a master container in that the supply container does not include dedicated columns for receiving storage bins from the access station and delivering storage bins to the access station, whereas such dedicated columns for receiving storage bins from the access station and delivering storage bins to the access station are present in the master container.

Since the supply container does not have dedicated columns for receiving storage bins from the access station and delivering storage bins to the access station, human access to the supply container is not needed. Therefore, in some embodiments, the second container may comprise an opening only for connecting to another mobile container. The opening may be for connection to a master container, or to another supply container.

Therefore, when the mobile container is going to be connected with the first (master) mobile container (or another second (supply) mobile container), for the purpose of connecting two or more automated storage and retrieval system together, at least a part of the at least one side panel may be removable (as noted above). When at least a part of the side panel is removed it may create an opening which may be at least the size of the maximum cross section of a bin handling vehicle carrying a bin (taken in a vertical plane perpendicular to the axis of movement of the bin handling vehicle when moving through the opening, said vertical plane being parallel to the plane of the panel in which the opening is formed) moving on the rail system.

Moreover, the opening should of course be located accordingly, i.e. positioned such that the bin handling vehicle can move from the rail system of the first mobile container on to the rail system of the second mobile container. That is, the opening may have a vertical extent extending at least from just below the horizontal plane of the rail system, upwards at least to the height of the bin handling vehicle carrying a bin on the rails. The opening may extend vertically below, and/or vertically above such an opening.

Of course, the opening may be larger than the size of the maximum cross section of a bin handling vehicle carrying a bin moving on the rail system. For example, the opening may have a height that is at least the height of a bin handling vehicle carrying a bin moving on the rail system, but the width may extend across substantially the entire side at which the two containers are to be connected. The opening may be created by removal of a panel, in which case the opening is of course substantially the size of the removed panel.

If connecting two mobile containers in a side-by-side arrangement along the long end side, at least a part of the long end side panel may be removable for making the opening. In another exemplary embodiment, the whole long end side panel is removable. In other embodiments, at least a part of the short end side panel may be removable for making the opening. In another exemplary embodiment, the whole short end side panel is removable.

It should be understood that one, two, three or all four side panels of a second mobile container can comprise openings having a size and position allowing a bin handling vehicle to move from the rail system of the second mobile container on to the rail system of another connected container. How many of the sides comprise openings will depend on how many other mobile containers the second mobile container is connected to.

Further, the second mobile container may comprise a controller for storing, receiving and/or transferring data regarding the items stored in the storage bins and the position of the storage bins of the second mobile container.

The controller of the second mobile container may be in communication with another controller, for example a master controller of a first (master) mobile container.

To facilitate the high precision alignment of the grid structure within a first mobile container with the grid structure of a connected second mobile container, the first storage grid structure of the first mobile container and/or the second storage grid structure of the second mobile container can be arranged on a horizontally displaceable base plate (within the respective mobile container) configured to allow horizontal displacement of the plate itself leading to displacement of the storage grid structure placed thereon.

Further, the second mobile container may comprise height adjustable feet fixed to an outer lower surface thereby allowing height adjustment and/or leveling of the second mobile container.

When connecting two mobile containers together, the part of the frame of each mobile container that is facing the other mobile container when connected can be connected by a coupling device. In one embodiment the part of the first container frame and the part of the second container frame facing each other when connected comprise the coupling device allowing the first container frame and the second container frame to be aligned.

In one exemplary embodiment a vertical extent of at least one of a base panel, top panel and/or one of the vertically extending profiles of the first mobile container may comprise at least one hole facing at least one corresponding hole arranged in a vertical extent of at least one of a base panel, top panel and/or one of the vertically extending profiles of the second mobile container for inserting a connecting pin between the first mobile container and the second mobile container for aligning the two containers in at least one of the vertical position and horizontal position.

In a preferred embodiment the first mobile container comprises at least two holes arranged within the vertical extent of the base panel facing at least two corresponding holes arranged on the vertical extent of the base panel of the second mobile container.

In a more preferred embodiment the first mobile container comprises at least four holes arranged within the vertical extent of the base panel facing at least four corresponding holes arranged on the vertical extent of the base panel of the second mobile container.

In a preferred embodiment the holes are evenly distributed along the vertical extent and/or one of the vertically extending profiles. Instead of connecting the mobile containers with pins located in holes, a ball-and-socket type coupling device can also be used, or other known coupling devices ensuring a tight fit alignment between the connected mobile containers.

The holes may have a funnel shape and the pin may be configured to match at least the smallest diameter of the funnel shaped holes, creating a tight fit. An example of a "funnel shaped" hole is a smoothly tapering hole, narrowing from a largest cross-section at the entrance to the hole, to a smallest cross-section at the other end of the hole, inside the frame (i.e. inside the base panel, top panel or vertically extending profile). The hole may have a circular cross-section along its length. Thus, the "funnel shaped" hole may be a conical (or frustoconical) shaped hole. Alternatively, the "funnel shaped" hole may comprise a broadly cylindrical outer portion (closest to the entrance to the hole) and a frustoconical inner portion (furthest from the entrance to the hole). Then, the cross section of the hole is initially constant for the outer portion, before narrowing along the inner portion.

The connecting pin may be telescopic such that the connecting pin occupies in a retracted state the hole in either the first mobile container frame or the hole in the second mobile container frame.

For connecting the first rail system of the first mobile container to the second rail system of the second mobile container, an intermediate element can be used allowing the storage bin vehicle to move between the first and second rail systems.

In a further embodiment of the mobile storage system, a mobile container can be arranged on top of another mobile container. In an exemplary embodiment a second mobile container (a supply container) can be arranged on top of a first mobile container (a master container). In this configuration the base panel of the second mobile container will have an opening corresponding to an opening in a top panel of the first mobile container. The openings are made to allow a storage bin to move between the first and second mobile container.

It should be understood that the mobile storage system may comprise a plurality of mobile containers that are vertically stacked.

Two vertically stacked mobile containers can be engaged by an interlocking device, such as the one shown in U.S. Pat. No. 5,346,084 A. However, any kind of interlocking device can be used for the purpose of keeping the containers vertically aligned.

In another embodiment the mobile container system comprises a plurality of second mobile containers (supply containers) aligned adjacent to each other for example in a side-by-side arrangement.

In a further embodiment one second mobile container (supply container) can be arranged on top of another second mobile container (supply container). The two second mobile containers may have corresponding openings allowing a storage bin to move between the two second mobile containers.

Further, the mobile container system may comprise a plurality of mobile containers arranged in a first row of side-by-side arranged mobile containers, where a second row of side-by-side arranged mobile containers is arranged on top of the first row. The system may comprise a plurality of such vertically stacked rows of mobile containers.

In a further embodiment the mobile container system may comprise at least one equipment container for storing equipment such as air conditioning systems, generators, fire-extinguishing systems. The equipment container can be connected to a first or second mobile container, i.e. to a master container or a supply container.

As mentioned above, two mobile containers may be connected and aligned providing for an accurate alignment of two rail systems of two automated storage and retrieval systems arranged within the two mobile containers. If provided, the height adjustable feet may align the mobile containers in the same horizontal level and thereby the automated storage and retrieval systems in the vertical Z-direction. If provided, the base plate may adjust the alignment of two storage and retrieval systems in the horizontal Y-direction and/or horizontal X-direction, and the intermediate element may connect the rails of the two storage and retrieval systems in the X-direction.

Further, the coupling device preferably provides a tight fit alignment between the connected mobile containers.

The present invention also relates to a method of providing a mobile storage system having the following steps:
providing a first mobile container;
arranging a first automated storage and retrieval system inside the first mobile container; and
transporting the first mobile container with the first automated storage and retrieval system inside to a location for use.

The method may further comprise the following steps:
providing a second mobile container;
arranging a second automated storage and retrieval system inside the second mobile container; and
transporting the second mobile container with the second automated storage and retrieval system inside to the location for use; and
connecting the first mobile container and second mobile container together.

In an embodiment where the first mobile container comprises a first container frame having a base panel, a top panel, four vertically extending profiles extending from each corner of the base panel to connect the base panel and the top panel, two long end side panels and two short end side panels, where at least a part of one of the side panels is removable, and where the second mobile container comprises a second container frame having a base panel, a top panel, four vertically extending profiles extending from each corner of the base panel to connect the base panel and the top panel and two long end side panels and two short end side panels, where at least a part of one of the side panels is removable, the method comprises:

a) removing the at least one part of one of the side panels of the first container frame thereby creating an opening being at least the size of the cross-section of a bin handling vehicle carrying a bin moving on the rail system, b) removing the at least one part of one of the side panels of the second container frame thereby creating an opening being at least the size of the cross-section of a bin handling vehicle carrying a bin moving on the rail system, c) arranging the opening of the first container frame in correspondence with the opening of the second container frame, and d) connecting the first rail system with the second rail system by arranging an intermediate element therebetween.

Further, step c) may further comprise connecting the first container frame with the second container frame by a coupling device allowing the first container frame and the second container frame to be aligned.

The method may further comprises adjusting, using height adjustable feet the height and/or horizontal level of the first mobile container or second mobile container with respect to the height of the other mobile container.

In one embodiment of the mobile container system the mobile containers have the size and shape of a 20', 40' and/or 45' intermodal container.

BRIEF DESCRIPTION OF THE DRAWINGS

The following drawings are appended to facilitate the understanding of the invention. The drawings show embodiments of the invention, which will now be described by way of example only, where:

FIGS. 11(*b*), (*d*) and (*e*) are detailed views of an intermediate element;

FIG. 14(*b*) is a detailed view of an adjustment device;

FIG. 15(*b*) is a detailed view of a height adjustment foot;

FIG. 16(*b*) is a detailed view of a pin;

FIG. 18(*c*) is a detailed view of a storage bin handling arrangement and a bin conveyor;

DETAILED DESCRIPTION OF THE INVENTION

Figure 1:
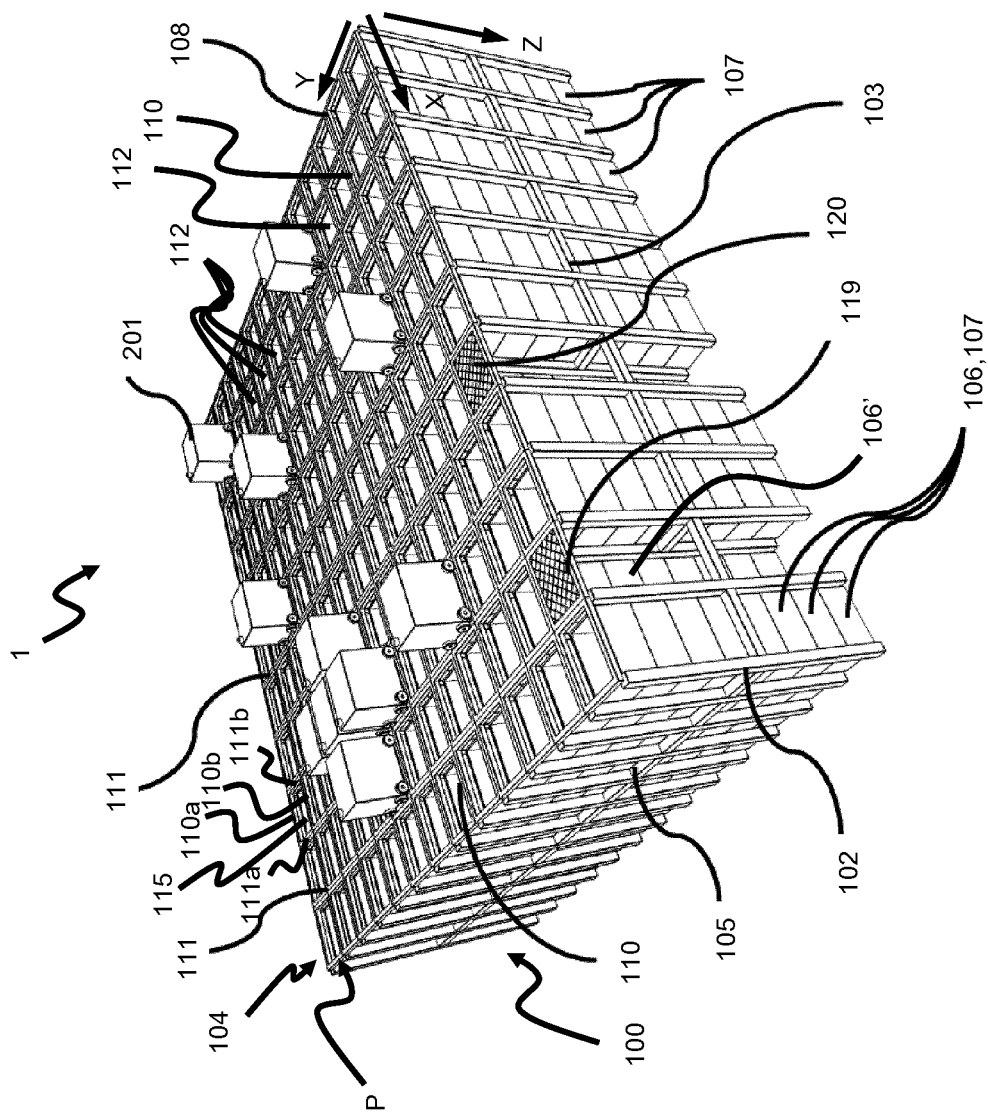
FIG. 1 is a perspective view of a prior art automated storage and retrieval system.

In the following, embodiments of the invention will be discussed in more detail with reference to the appended drawings. It should be understood, however, that the drawings are not intended to limit the invention to the subject-matter depicted in the drawings.

The framework of the automated storage and retrieval system according to the present invention may be constructed in accordance with the prior art framework described above in connection with FIGS. 1-6, i.e. it may comprise a number of upright/vertical members and preferably a number of horizontal members, and further, the framework may comprise a rail system of parallel rails in the X direction and the Y direction arranged across the top of storage columns/grid columns.

The prior art grid shown in FIG. 1 has a height of eight cells. It is understood, however, that the grid in principle can be of any height that fits inside a mobile container. Similarly, the prior art grid shown in FIG. 1 has eleven cells in the X direction and thirteen cells in the Y direction. It is understood, however, that the grid in principle can be of any size that fits inside a mobile container. Further, the mobile container can be of any suitable size.

Mobile storage systems and mobile containers having an automated storage and retrieval system therein will now be discussed in more detail.

A mobile container having an automated storage and retrieval system can be transported to any desired location by plane, truck, train etc. During transport the container frame comprises a base panel, a top panel, four vertically extending profiles, and four side panels which are attached to the vertically extending profiles at their vertical edges, wherein a first side panel preferably comprises a door to access the automated storage and retrieval system inside the mobile container. When the mobile container is placed at its desired location it may be ready for operation. However, if the mobile container is to be interconnected with one or more mobile containers for a bin handling vehicle to move between the interconnected mobile containers, at least a part of one of the side walls of the mobile container needs to be removed.

Figure 7:
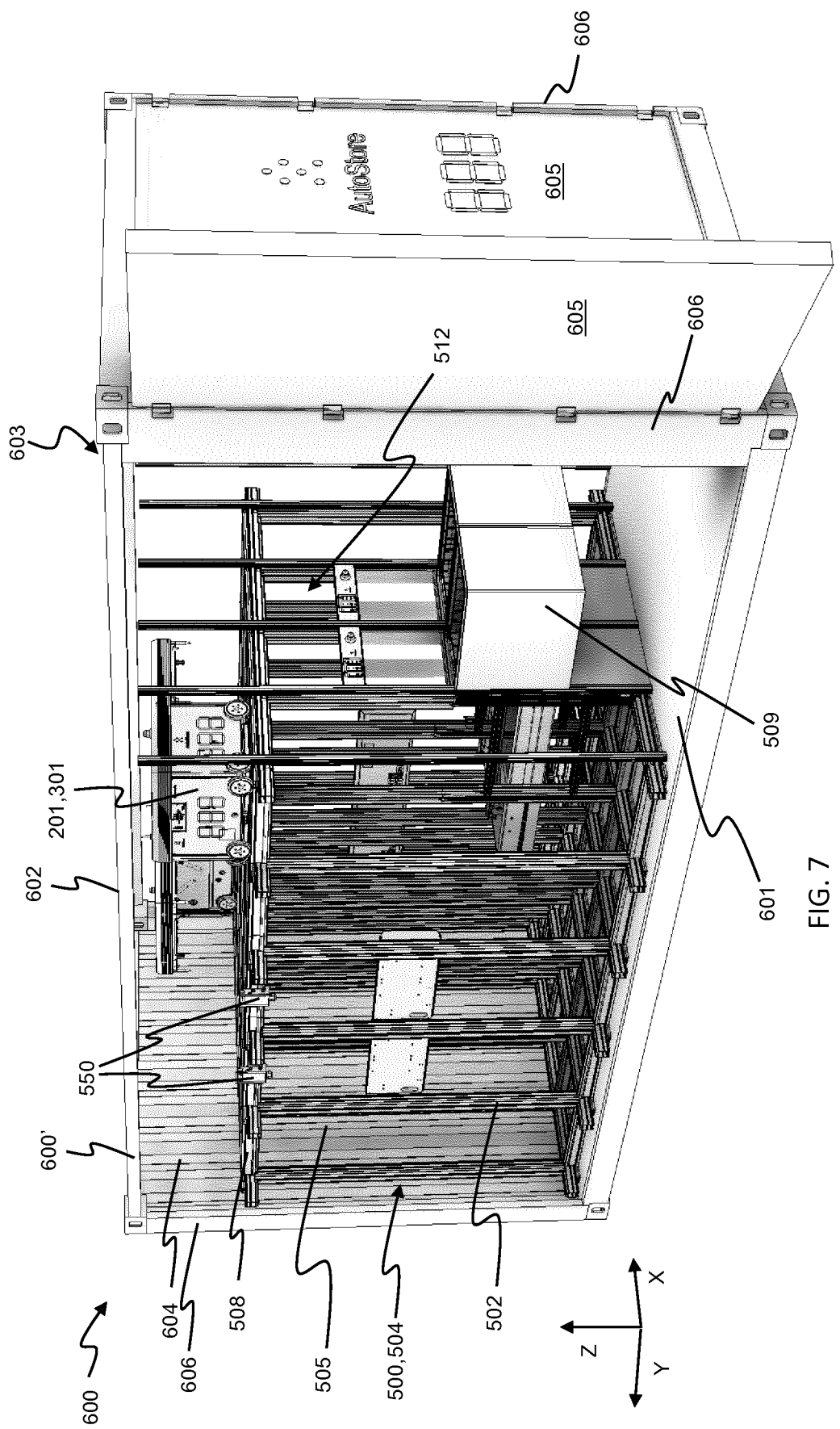
FIG. 7 is a perspective view of a first mobile container comprising an automated storage and retrieval system having an access station.

FIG. 7 illustrates an exemplary embodiment of a mobile storage system of a first mobile container 600 having a first automated storage and retrieval system 500.

The first mobile container 600 has a base panel/floor 601 and a top panel/roof 602. The top panel 602 is arranged directly above the base panel 601, and they are separated by four vertically extending profiles 606, such as upright poles, which extend from the corners of base panel 601 to the corresponding corners of the top panel. Four side panels 603, 604 can be attached at their vertical edges to adjacent vertically extending profiles 606, to form walls of the container frame 600'. In FIG. 7, a first short end side panel 604 is attached at its vertical edges to two adjacent vertically extending profiles 606. Between the two other vertically extending profiles 606 is a door 605, which when closed acts as a second short end side panel 604. In FIG. 7 the first long end side panel has been physically removed, while the second long end side panel cannot be seen for illustrational purposes.

The first automated storage and retrieval system 500 is arranged inside the container frame 600' of the first mobile container 600 on top of the base panel 601. The first automated storage and retrieval system 500 has a grid structure 504 having vertical members 502 defining multiple storage columns 505. The vertical members 502 are interconnected at their upper ends by a rail system 508 arranged in a grid pattern across the top of the first storage grid structure 504. On this rail system 508, a plurality of bin handling vehicles 201, 301 are operated to raise storage bins (not shown) from, and lower storage bins into the storage columns 505, and also to transport the storage bins above the storage columns 505. The rail system 508 comprises a first set of parallel rails arranged to guide movement of the bin handling vehicles 201, 301 in a first direction X across the rail system 508, and a second set of parallel rails arranged perpendicular to the first set of rails to guide movement of the bin handling vehicles 201, 301 in a second direction Y which is perpendicular to the first direction X. In this way, the rail system 508 defines grid columns/storage columns 505 above which the bin handling vehicles 201, 301 can move laterally above the storage columns 505, i.e. in a plane which is parallel to the horizontal X-Y plane.

Figure 3:
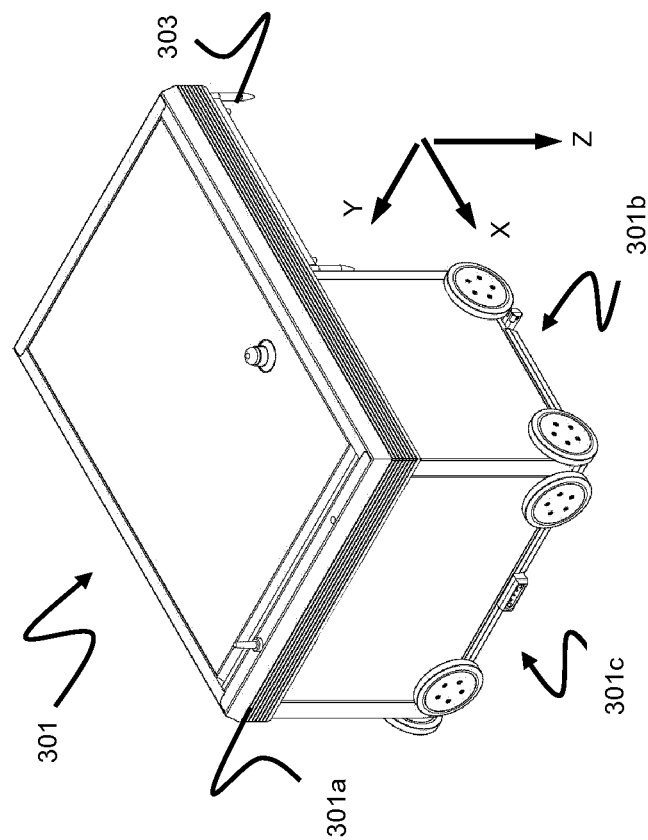
FIG. 3 is a perspective view of a prior art bin handling vehicle having a cantilever for containing storage bins underneath.
Figure 2:
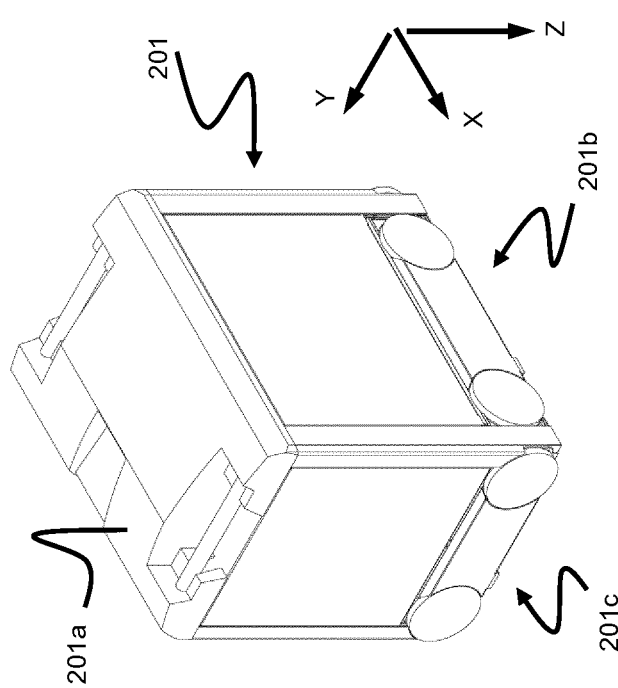
FIG. 2 is a perspective view of a prior art bin handling vehicle having a centrally arranged cavity for containing storage bins therein.
Figure 5:
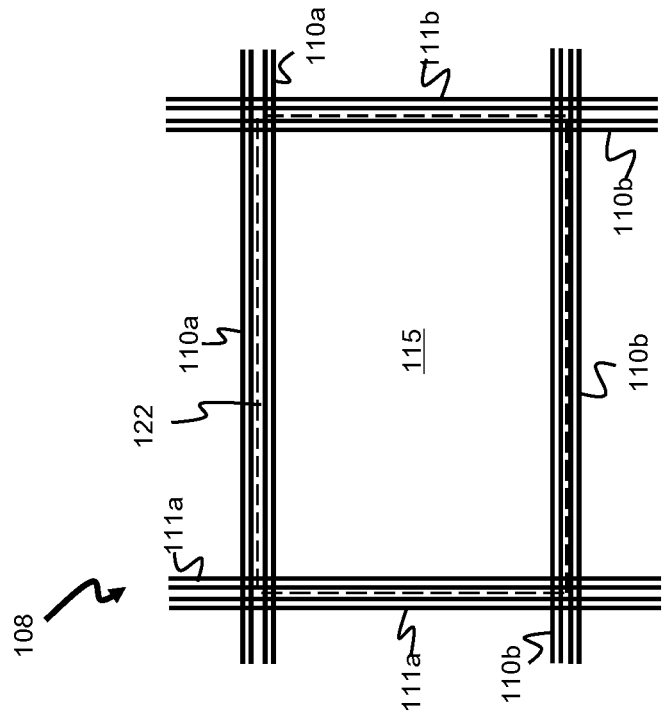
FIG. 5 is a top view of a prior art double rail grid.
Figure 4:
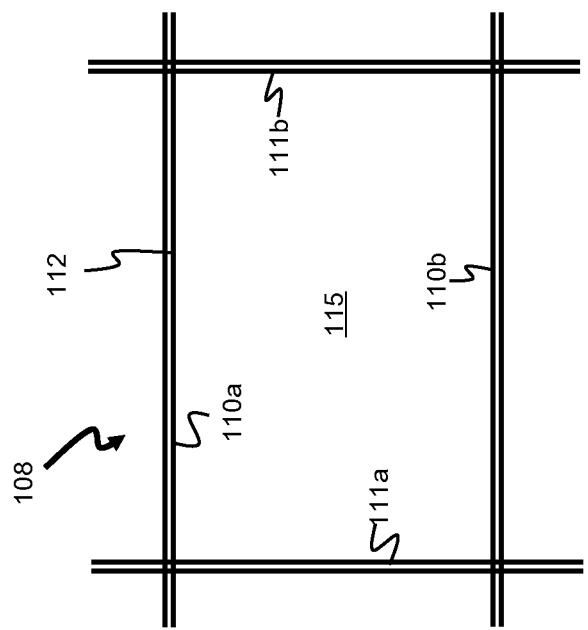
FIG. 4 is a top view of a prior art single rail grid.
Figure 6:
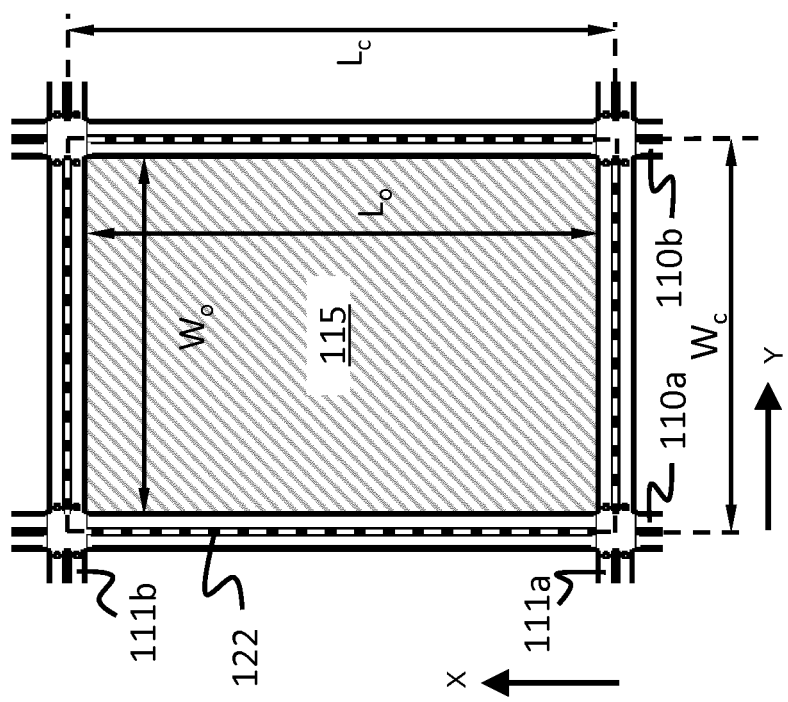
FIG. 6 is a top view of a rail system of the automated storage and retrieval system according to FIG. 1.

Each bin handling vehicle 201, 301 comprises a vehicle body/chassis and first and second sets of wheels which enable the lateral movement of the bin handling vehicles 201, 301 in the X direction and in the Y direction, respectively. With reference to FIGS. 2 and 3 two wheels in each set are fully visible. The first set of wheels 201b, 301b is arranged to engage with two adjacent rails of the first set of rails, and the second set of wheels 201c, 301c is arranged to engage with two adjacent rails of the second set of rails. Each set of wheels 201b, 301b 201c, 301c can be lifted and lowered, so that the first set of wheels 201b, 301b and/or the second set of wheels 201c, 301c can be engaged with the respective set of rails at any one time.

To enable access to the storage bins from the outside of the storage grid structure 504, four columns 512 are shown which are dedicated for drop off and/or pick of storage bins by the bin handling vehicle 201, 301. In connection with two of the four columns 512, two adjacent access stations 509 are shown where an operator can have access to withdraw items from the storage bins and/or have access to supply items into the storage bins. Such a first mobile container 600 comprising a first storage grid structure 504 wherein the storage bins can be accessed by an operator can be referred to as a master container. The door 605 allows the operator to access the inside of the master container 600.

The master container may comprise one or more charging stations 550 for charging the bin handling vehicles. The charging stations are preferably arranged at or on the rail system 508. In FIG. 7 the charging stations 550 are arranged at the periphery of the rail system 508 allowing the bin handling vehicles 201, 301 to access the charging stations 550. Such charging stations are known from WO 2015/104263 A2.

The master container may comprise a controller/control unit (not shown) for storing, receiving and/or transferring data regarding the items stored in the storage bins and for storing, receiving and or transferring data regarding the position of each storage bin. The controller may also communicate with the bin handling vehicles 201, 301 via e.g. a wireless link such that the bin handling vehicles 201, 301 can be recharged at the charging station 550 when needed, typically at night.

The master container may further comprise a master controller/control system for storing, receiving and/or transferring data from other controllers within the system. The master controller may further store, receive and/or transfer data regarding the items being removed or added by an operator at the access station.

The mobile storage system may consist of only one master container as described above where the container frame comprises a base panel, a top panel and four vertical extending profiles forming the edges of four side walls, where the one side wall comprises a door for an operator to access the access stations of the automated storage and retrieval system inside the master container.

The first container frame 600' of the first mobile container 600 shown in FIG. 7 may be a prior art intermodal container as described. It may be a 20' container, a 40' container or a 45' container as described. If the first mobile container 600 is to be interconnected with another mobile container, for a bin handling vehicle to move between the interconnected mobile containers, at least a part of one of the side walls of the first mobile container 600 needs to be removed.

Figure 8:
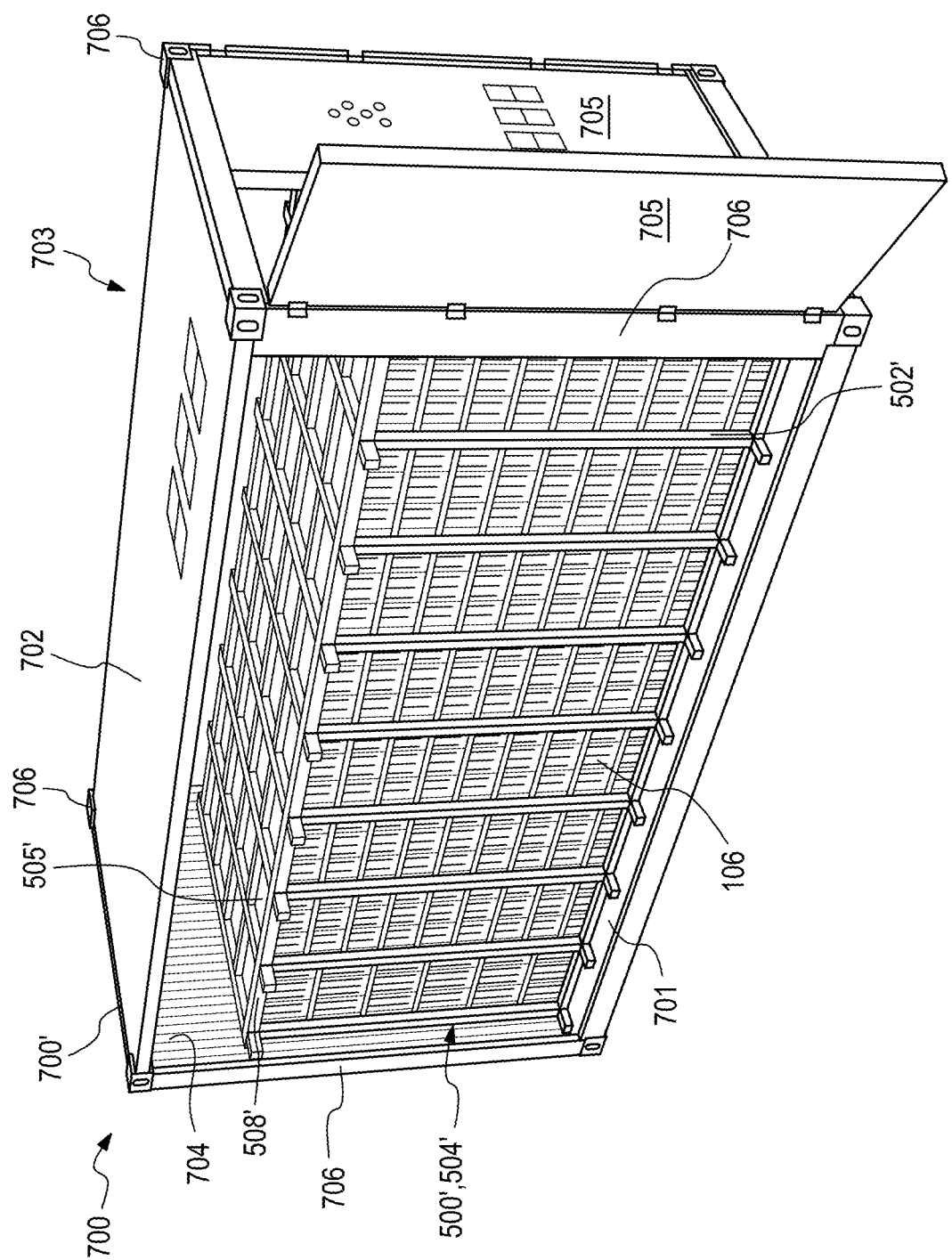
FIG. 8 is a perspective view of a second mobile container.

FIG. 8 illustrates a mobile storage system with a second mobile container 700 having a second automated storage and retrieval system 500'.

The second mobile container 700 has a base panel/floor 701 and a top panel/roof 702. The top panel 702 is arranged directly above the base panel 701, and they are separated by four vertically extending profiles 706 which extend from the corners of base panel 701 to the corresponding corners of the top panel 702. Four side panels can be attached at their vertical edges between adjacent vertically extending profiles 706. In FIG. 7 two adjacent vertically extending profiles 706 form the edges of a short end side panel 704, and the two other vertically extending profiles 706 form the edges of a door 705, which when closed acts as a short end side panel 704. In FIG. 7 the long end side panels have been physically removed for attaching the second mobile container with two other mobile containers, one on each side. The mobile container may be a first mobile container or a second mobile container, see FIGS. 9 to 12.

During transportation of the second mobile container 700, two long end side panels (not shown) will be attached to the second container frame 700' enclosing the automated storage and retrieval system 500' arranged inside the second mobile container. When the second mobile container 700 has arrived at the suitable location, the second mobile container 700 will be connected to at least one other mobile container comprising an automated storage and retrieval system. Before or during connection, at least one of the long end side walls will be at least partly removed for allowing the bin handling vehicle(s) 201, 301 to move between the two mobile containers each comprising an automated storage and retrieval system. The connected mobile container(s) will then have a corresponding opening(s) in its long end side wall(s).

FIG. 7 shows the second automated storage and retrieval system 500' arranged inside the second container frame 700' of the second mobile container 700. The second automated storage and retrieval system 500' has a rail system 508' arranged in a grid pattern across the top of the second storage grid structure 504'. The second storage grid structure 504' has a plurality of vertical members 502' defining the multiple storage columns 505', and the vertical members 502' are interconnected at their upper ends by the rail system 508'. On this rail system 508', a plurality of bin handling vehicles (not shown) can be operated to raise storage bins 106 from, and lower storage bins 106 into, the storage columns 505', and also to transport the storage bins 106 above the storage columns 505'. The rail system 508' comprises a first set of parallel rails arranged to guide movement of the bin handling vehicles in a first direction X across the top of the second storage grid structure 504', and a second set of parallel rails arranged perpendicular to the first set of rails to guide movement of the bin handling vehicles in a second direction Y which is perpendicular to the first direction X. In this way, the rail system 508' defines grid columns/storage columns 505' above which the bin handling vehicles can move horizontally above the storage columns 505', i.e. in a plane which is parallel to the horizontal X-Y plane.

Each bin handling vehicle comprises a vehicle body and first and second sets of wheels which enable the lateral movement of the bin handling vehicles in the X direction and in the Y direction, respectively. With reference to FIGS. 2 and 3 two wheels in each set are fully visible. The first set of wheels 201*b*, 301*b* is arranged to engage with two adjacent rails of the first set of rails, and the second set of wheels 201*c*, 301*c* is arranged to engage with two adjacent rails of the second set of rails. Each set of wheels 201*b*, 301*b*; 201*c*, 301*c* can be lifted and lowered, so that the first set of wheels 201*b*, 301*b* and/or the second set of wheels 201*c*, 301*c* can be engaged with the respective set of rails at any one time.

The second mobile container 700 may be referred to as a supply container as it may supply the master container with storage bins which can be delivered to the access port thereof which will be described in further detail in FIGS. 9 to 12.

The second mobile container 700 may comprise one or more charging stations for charging the bin handling vehicles 201, 301. The charging stations(s) is/are preferably arranged at or on the rail system 508'.

The second mobile container 700 may comprise a controller for storing, receiving and/or transferring data regarding the items stored in the storage bins in the second mobile container 700 and for storing, receiving and or transferring data regarding the position of each storage bin. The controller may also communicate with the bin handling vehicles 201, 301 via e.g. a wireless link.

The controller may also communicate with master controller of the first mobile container 600 (for example, via a wireless link), in order to transfer data regarding the items stored in the storage bins in the second mobile container 700 and data regarding the position of each storage bin.

The second container frame 700' of the second mobile container 700 shown in FIG. 8 may be a prior art intermodal container as described above. It may be a 20' container, a 40' container or a 45' container as described. When the second mobile container 700 is to be interconnected with another mobile container, for a bin handling vehicle to move between the interconnected mobile containers, at least a part of one of the side walls of the second mobile container 700 needs to be removed.

A 20' container as described in the prior art can store up to 279 bins, wherein each bin has a width of 449 mm, length of 649 mm and a height of 220 mm.

A 20' container as described in the prior art can store up to 186 bins, wherein each bin has a width of 449 mm, length of 649 mm and a height of 330 mm.

A 40' container as described in the prior art can store double the number of storage bins that a 20' container can store.

Figure 9:
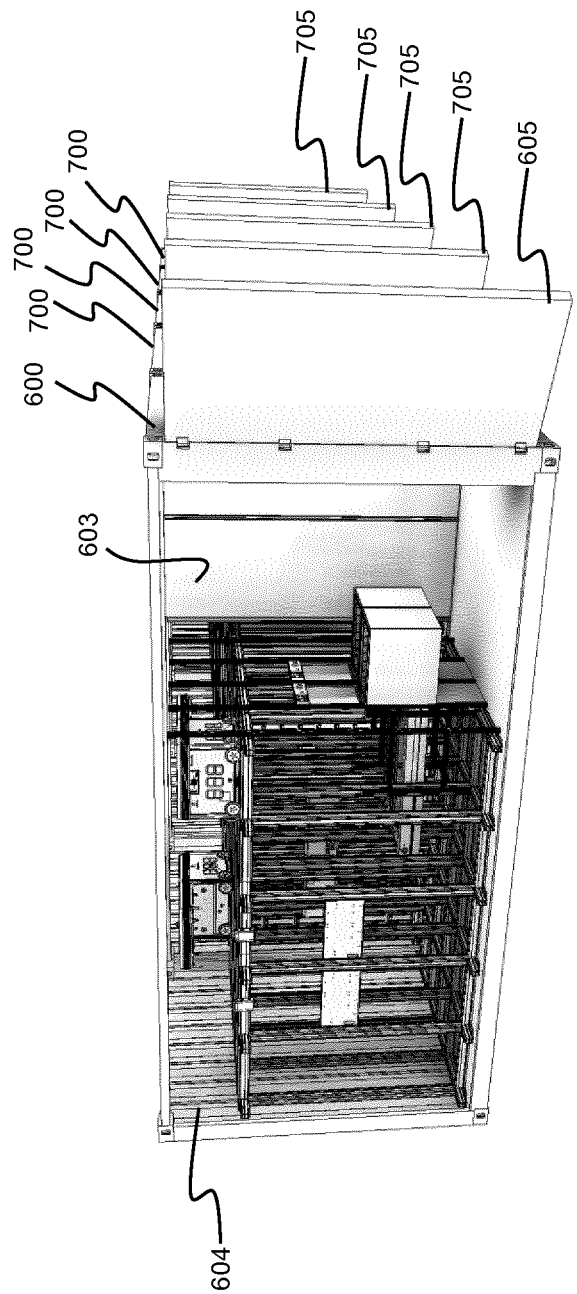
FIG. 9 is a front view of the mobile storage system showing an open first mobile container in a side-by-side arrangement with second mobile containers.

FIG. 9 illustrates a mobile storage system having one first mobile container 600 and four second mobile containers 700 arranged in a side-by-side arrangement. The figure shows that when the mobile containers 600, 700 are removably connected there is an opening at the connecting long end side panels 603, 703 of the two connected mobile containers 600, 700, or the connecting long end side panels are removed. In this aspect, at least a part of one of the long end side panels 603, 703 has been removed before or during connection of the container frames 600', 700' and is shown as removed in FIG. 9. After or during disconnection of the mobile containers, the removed part of the side panel is reassembled closing the opening.

Further it is shown that one of the short end side panels 604, 704 of the mobile containers has a door 605, 705 allowing access to the inner space of the respective container frame 600', 700. The long end side panels 603, 703 that are at the ends of the system and do not comprise another mobile container 600, 700 connected thereto generally do not comprise an opening.

FIG. 9 illustrates a mobile storage system having one master container/first mobile container 600 connected to one supply container/second mobile container 700 which is further connected to another supply container which is connected to yet another supply container and so on. Thus, the mobile storage system can be customized depending on the storage needed.

Figure 10:
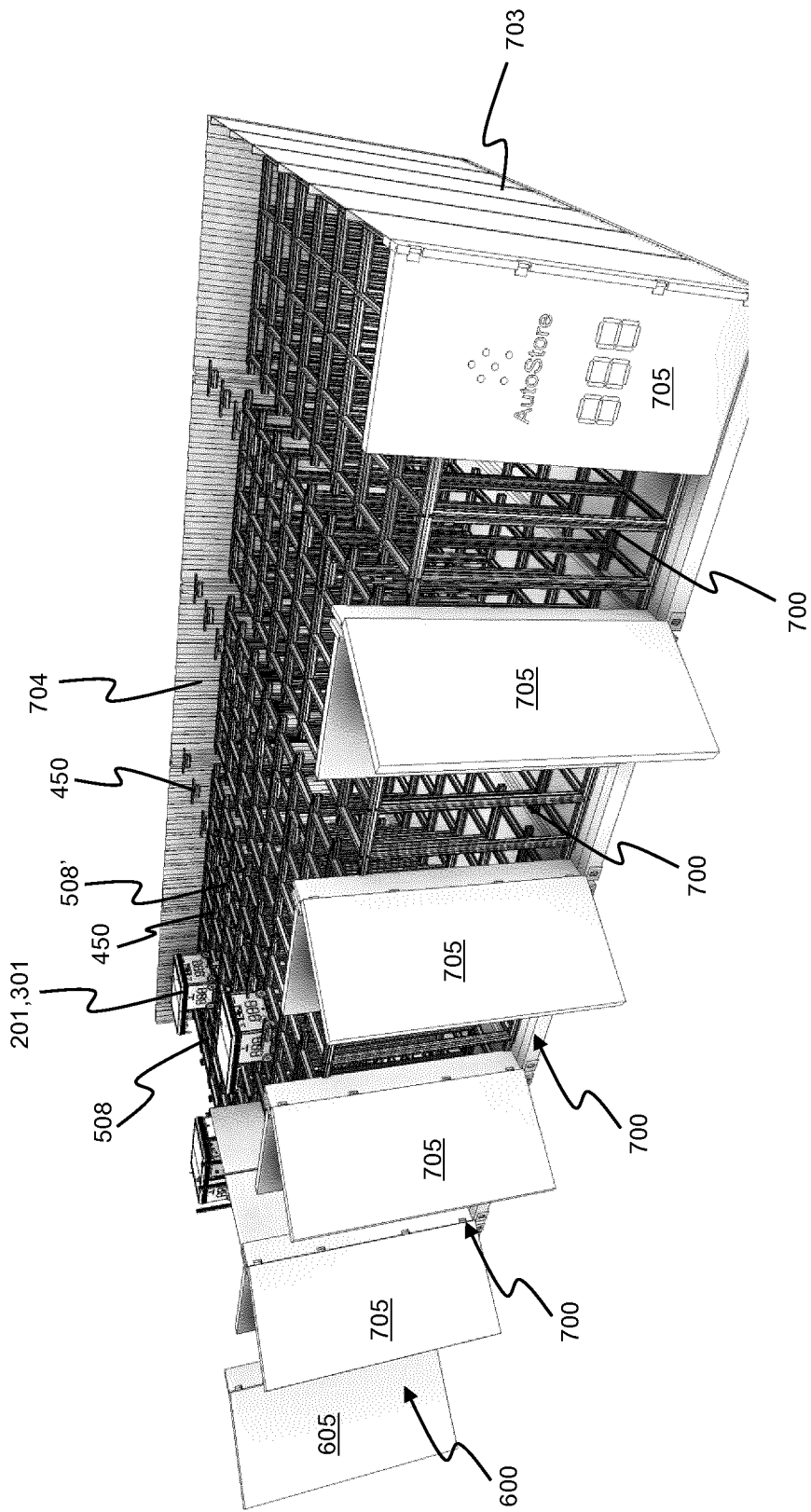
FIG. 10 is an open top view of the mobile storage system in FIG. 9.

FIG. 10 is an open top view of the mobile storage system shown in FIG. 9. As can be seen, the openings in the connected long end side panels allow the first and second automated storage and retrieval system 500, 500' to be interconnected such that the bin handling vehicles 201, 301 can move between the rail system 508 of the first grid structure 504 and the rail system 508' of the second grid structure 504'.

If there is a gap between the first rail system 508 and the second rail system 508', intermediate elements 450 can be connected to the first and/or second rail systems 508, 508' allowing the bin handling vehicles 201, 301 to move thereon between the first and second rail systems 508, 508'.

For illustrational purpose, in FIG. 10 the intermediate elements 450 are illustrated hanging above the gaps which they will cover when connected.

Figure 11:
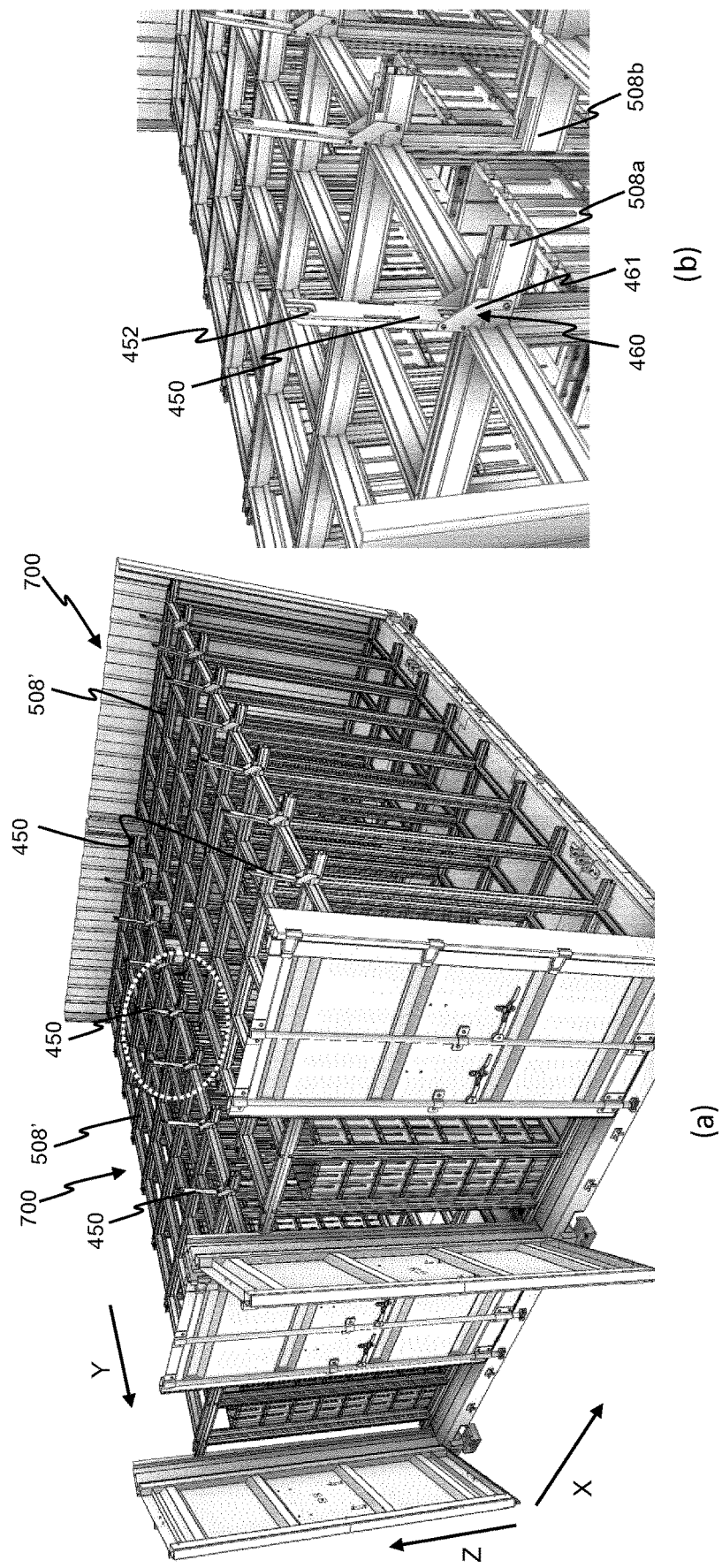
FIGS. 11(*a*) and (*c*) are open top views of two second mobile containers.
Figure 11:
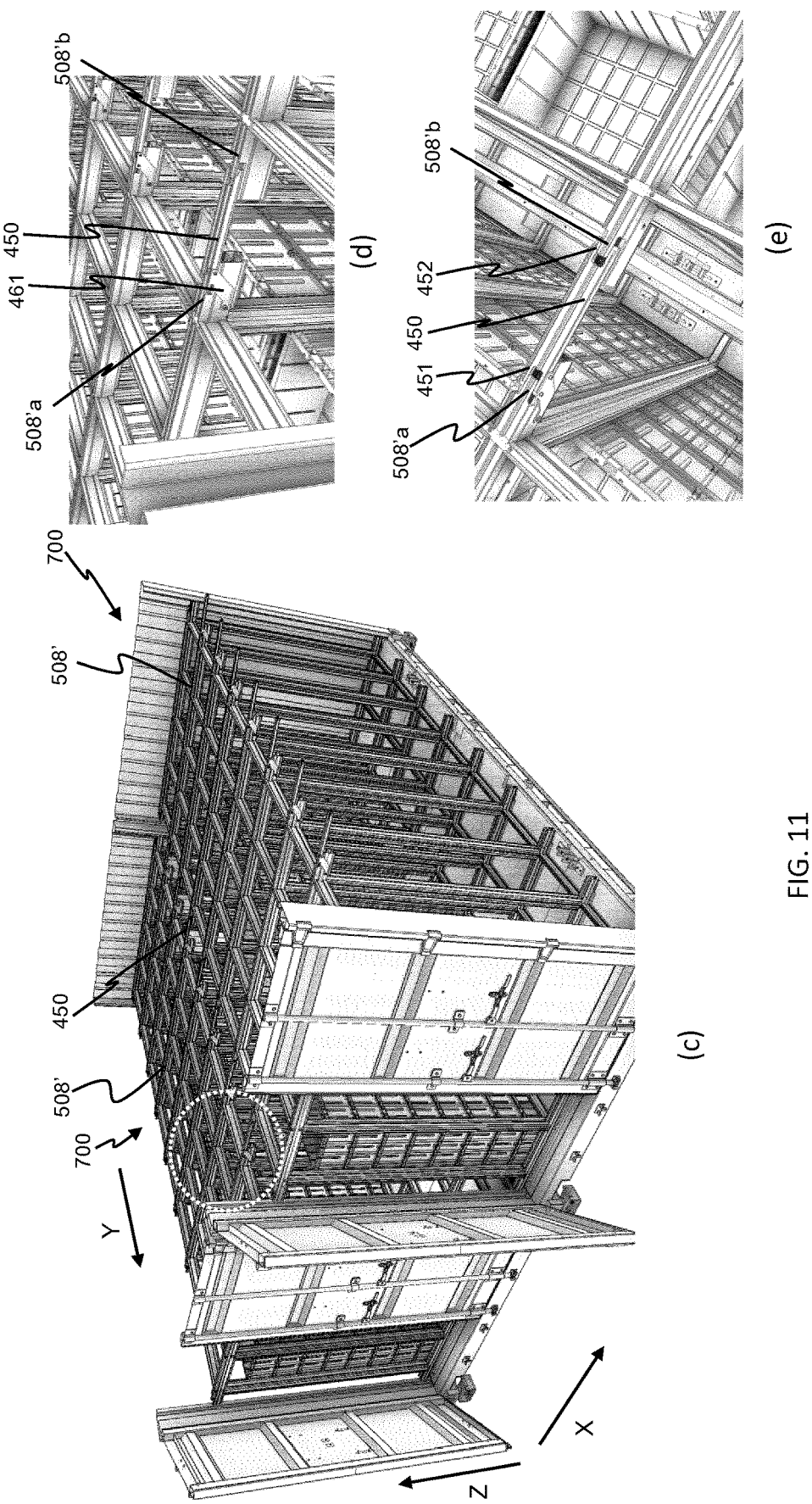

FIG. 11 illustrates an example of how the intermediate element 450 can connect a first rail 508'*a* of one rail system 508' with a second rail 508'*b* of another rail system 508' of two adjacent second mobile containers 700. It should be understood that the same is applicable when connecting two rail systems between a first mobile container and a second mobile container arranged adjacent to each other, or two rail systems between two adjacent first mobile containers.

FIG. 11(*a*) shows two connected second mobile containers 700 where the rail system 508' of one of the second mobile containers 700 has an intermediate element 450 connected thereto, but where the two rail systems 508' are not yet connected.

FIG. 11(*b*) shows a detailed view of the circled area in FIG. 11(*a*), where the intermediate connection element 450 is connected to a first rail 508'*a* of the first rail systems 508' via a pivot connection arrangement 460. The pivot connection arrangement 460 is connected to the first rail 508'*a* and the intermediate connection element 450 via suitable fastening means (e.g. pivoting bracket 461 fastened by screw, bolts, pins etc.) known to the skilled person.

In a disconnected state (in which the intermediate connection element 450 is disconnected from the second rail 508'*b* the second rail system 508') the pivot connection arrangement 460 and the intermediate connection element 450 are pivoted in an upward direction relative the rail system 508', as shown in FIGS. 11(*a*) and (*b*), in which the two rail systems 508' of the two second mobile containers are not connected.

In another example, not shown, the pivot connection arrangement 460 can be pivoted to rest in a downward position and to be pivoted upwardly for connection with the other rail system 508'.

As disclosed in FIGS. 11(*a*) to (*d*), the intermediate connection element 450 can be considered to form part of the first rail 508'*a* of the one rail system 508' which it is connected to. In the solution disclosed in FIGS. 11(*a*) to (*d*) the intermediate connection element 450 comprises a first and second end 451, 452. The second end 452 can be seen as a receiving part which is to be connected to a second rail 508'*b* of the other rail system 508'.

The receiving part at the second end 452 of the intermediate connecting element 450 may comprise a recess, i.e. female part, which is complementary to the second rail 508'*b* i.e. male part. In addition, the first end 451 of the intermediate connection element 450 connectable to the first rail 508'*a* can be formed with a similar recess to provide some flexibility in the connection between the intermediate connection element 450 and first rail 508'*a*.

The cooperation between the intermediate connection element 450 and the first rail 508'*a* may, when the intermediate connection element 450 is arranged mainly horizontally connecting the first rail 508'*a* of the one rail system 508' and the second rail 508'*b* of the other rail system 508', be such that parts of the intermediate connection element 450 rests on a upper surface of the second rail 508'*b*. The surface is preferably substantially horizontal such that the intermediate connection element 450 provides substantially flush drive rails between the first rail 508'*a* and the second rail 508'*b* for the bin handling vehicles 201, 301.

FIGS. 11(*c*) to (*e*) show the intermediate element 450 in FIGS. 11(*a*) and (*b*), but with the intermediate element 450 is in a connected position such that the first and second rails 508'*a*, 508'*b* are connected.

FIG. 11 (*e*) is a top-view of the intermediate element 450 of FIGS. 11(*c*) and (*d*) in a connected position.

In FIGS. 11(*d*) and (*e*), the recesses at the first and second end 451, 452 of the intermediate connection element 450 and complementary parts of the first and second rails 508'*a*, 508'*b* are shown in more detail. The connecting part of the second rail 508'*b* may, as shown, extend approximately halfway into the recess of the second end 452 of the intermediate connection element 450 allowing some relative axial movement between the second rail 508'*b* and the first rail 508'*a* when connected.

As shown in FIG. 11 the intermediate connection element 450 is pivoted between a connected position and non-connected position.

The rail system in FIG. 11 comprises a single rail in the Y direction and a double rail in the X direction, however this is only one option, as there may be either only single rails or only double rails both in the X and Y directions.

It should be noted that a very high degree of accuracy is needed when connecting two automated storage and retrieval systems together. This is mainly due to the bin handling vehicle's low degree of flexibility and associated low tolerance to irregularities in the rail system. To avoid or at least reduce the possibilities of disruption during operation of the mobile storage system, the rails to be connected should be aligned as precisely as possible. When looking at the connection of the first and second rail 508'*a*, 508'*b* in FIG. 11, both the first and second rail 508'*a*, 508'*b* should have the same Z-coordinate and the same axis in the X-direction for the bin handling vehicle to be able to move from the one rail system 508' to the other rail system 508'. Their positioning differences at the point where the first and second rails 508'*a*, 508'*b* are connected should preferably not exceed 1/10 mm in the Y-direction.

When connected, the axial flexibility of the intermediate element 450 allows for some relative movement between the first and second rail 508'*a*, 508'*b* in the X-direction, e.g. +/−40 mm, +/−15 mm, or more or less.

Figure 12:
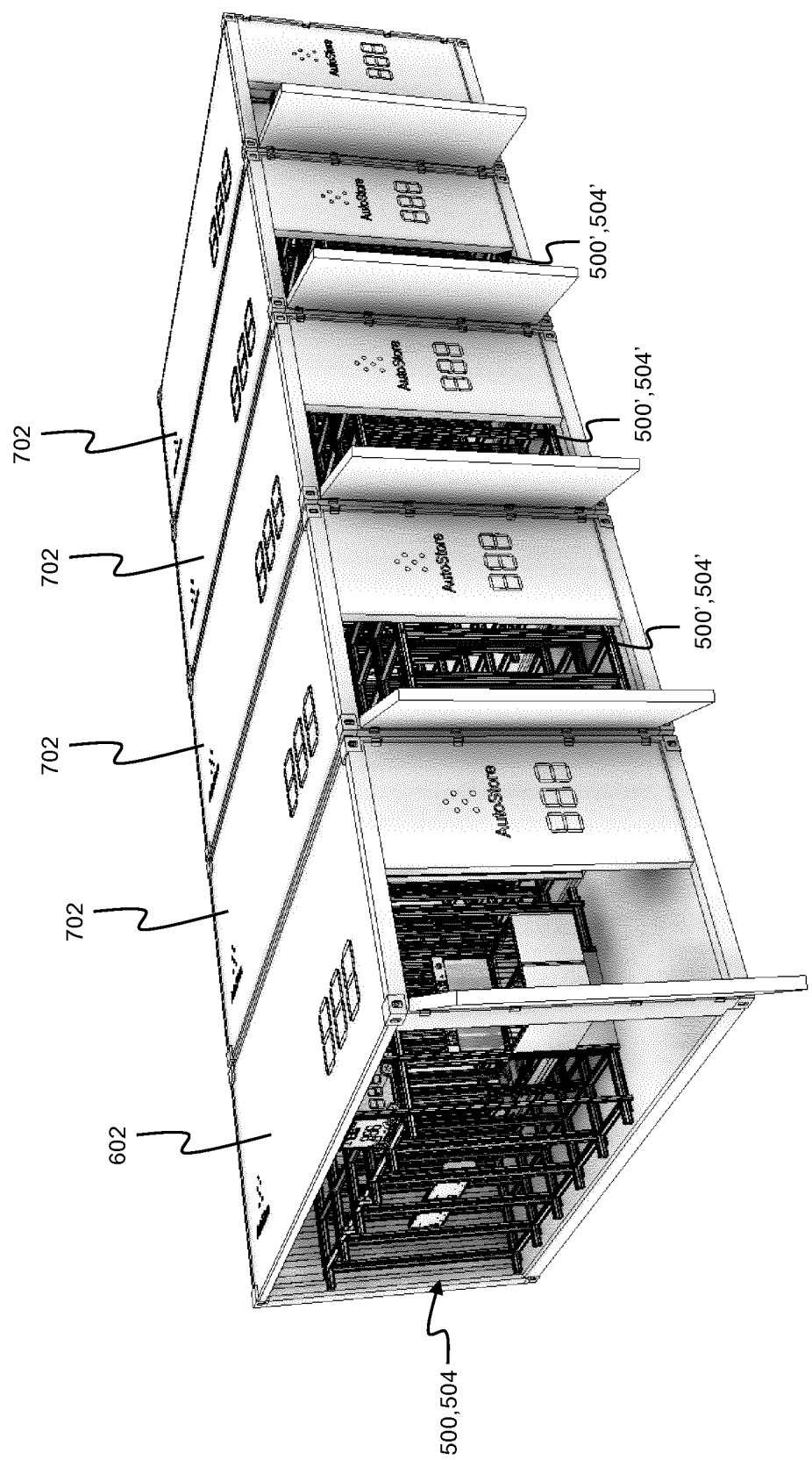
FIG. 12 is a perspective view of a mobile storage system.

FIG. 12 is a top view of the mobile storage system shown in FIGS. 9 and 10, wherein the top panels 602, 702 are shown.

Figure 13:
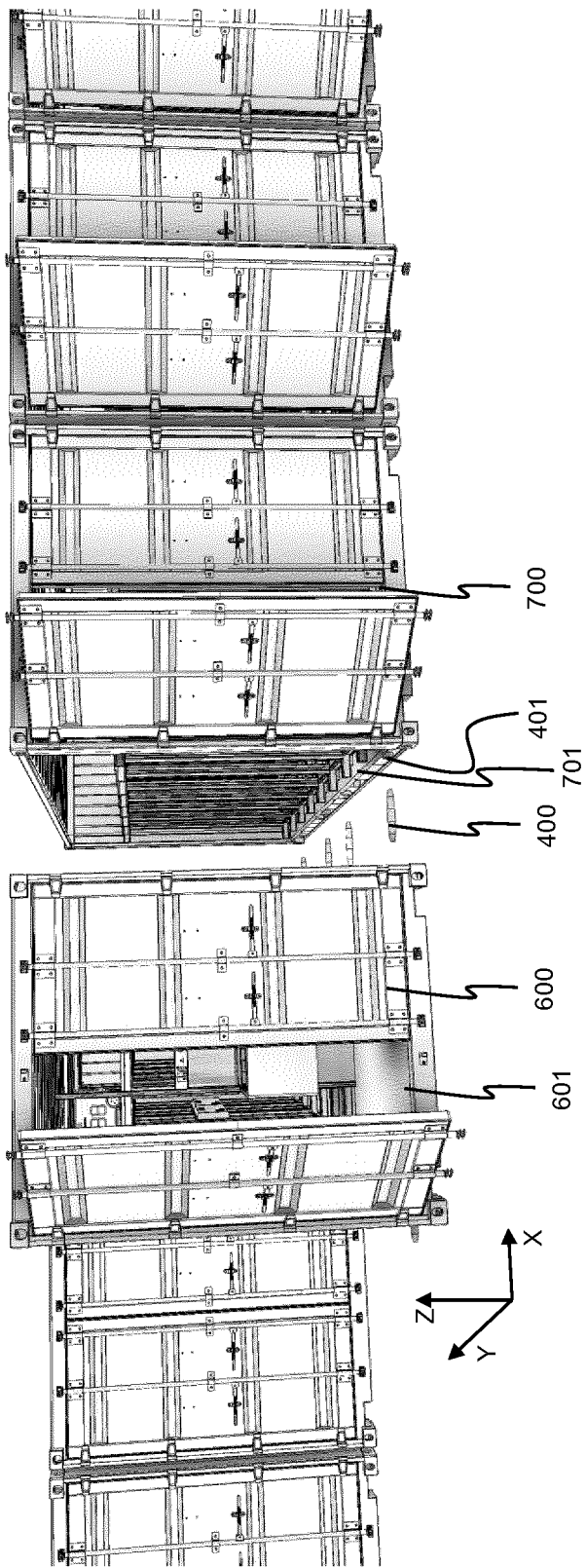
FIG. 13 is a side view of the connection between two mobile containers.

FIG. 13 illustrates how the mobile containers can be connected in a side-by-side arrangement with four coupling devices/connecting devices 400 arranged between the mobile containers to be connected. This exemplary aspect shows the connection between a first mobile container 600 and a second mobile container 700 but would be the same if two first mobile containers 600 or two second mobile containers 700 were connected together in a side-by-side arrangement.

Due to the high degree of accuracy mentioned above when connecting two automated storage and retrieval systems together as shown in FIG. 11, the connection of the two mobile containers illustrated in FIG. 13 should also have a high degree of accuracy, meaning that the first mobile container 600 and the second mobile container 700 should have equal Z-coordinates and Y-coordinates, and be parallelly arranged in the X-direction.

As already mentioned above with regard to FIG. 9 at least a part of one of the long end side panels of the first and second mobile containers 600, 700 may be removably connected to the container frame 600', 700. As shown in FIG. 9 the whole long end side panel was removed, however, in order for the system to be able to operate, only a part of the panel needs to be removed to create an opening such that the bin handling vehicles can move from the rail system of one mobile container on to the rail system of another mobile container. Thus, in this mobile storage system the opening should be at least the size of the maximum cross section of a bin handling vehicle carrying a bin (taken in a vertical plane perpendicular to the axis of movement of the bin handling vehicle when moving through the opening, said vertical plane being parallel to the plane of the panel in which the opening is formed) moving on the rail system, when the system comprises two or more side-by-side arranged mobile containers. Moreover, the opening should of course be located accordingly, i.e. positioned such that the bin handling vehicle can move from the rail system of one mobile container on to the rail system of another mobile container.

In the exemplary embodiment shown in FIG. 13, the long end side panels that correspond to the connecting vertical faces of the mobile containers are removed, thereby creating openings that are larger than the vertical size of a rail system having a bin handling vehicle carrying a bin moving thereon.

The base panels of the first mobile container 600 and second mobile container 700 each have a cuboidal shape. Thus, each base panel has a length and a width, defining an upper surface and lower surface of the base panel, and a depth (i.e. a vertical extent) that extends between the upper surface and the lower surface of the base panel.

The top panels of the first mobile container 600 and second mobile container 700 each have a cuboidal shape. Thus, each top panel has a length and a width, defining an upper surface and lower surface of the top panel, and a depth (i.e. a vertical extent) that extends between the upper surface and the lower surface of the top panel.

The vertically extending profiles of the first mobile container 600 and second mobile container 700 each have a cuboidal shape. Thus, each vertically extending profile has a length and a width, defining an upper surface and lower surface of the vertically extending profile, and a depth (i.e. a vertical extent) that extends between the upper surface and the lower surface of the vertically extending profile.

Further, a vertical extent of the base panel 601 of the first mobile container 600 that is facing a vertical extent of the base panel 701 of the second mobile container which it is to be connected to has at least one hole 401 for inserting the coupling device 400, having the shape of a connecting pin, in a tight fit configuration.

Similarly, corresponding holes are provided in the vertical extent of the base panel 701 of the second mobile container.

Whilst the figure illustrates that the first and second mobile containers comprise holes for connecting the coupling device arranged in the vertical extent of the base panels, it should be understood that the connection alternatively or additionally can be done by arranging the holes on any vertical extent of the top panel and/or vertically extending profiles of the first and second mobile container facing each other when connected.

In other words, the holes can be distributed in any arrangement along the frames of the mobile containers facing each other during connection, allowing a tight fit configuration after inserting the coupling device and connecting the two mobile containers.

The holes 401 have a funnel shape and the pins 400 are configured to match at least the smallest diameter of the funnel shaped holes 401 creating a tight fit.

The pin illustrated in FIG. 13 has a smaller cross-section at its ends than at its midpoint such that the cross-section of the pin 400 expands from the ends towards the midpoint of the pin 400 which corresponds to the funnel shaped opening.

The diameter of the cross-section at the midpoint may be at least 1.05 times greater than the diameter of the cross-section at the ends of the connecting pin, preferably at least 1.07 times greater, more preferably at least 1.09 times greater.

The diameter of the cross-section of the pin at the midpoint can for example be from 4 to 10 cm, the diameter of the cross-section of the ends can be from 2 cm to 7 cm, and the total length of the pin can be from 10 to 50 cm.

In one example, the diameter of the cross-section of the pin at the midpoint is 5.5 cm, the diameter of the cross-section of the ends is 5 cm, and the total length of the pin is 25 cm.

The number of holes and connecting pins to be inserted into the holes varies depending on the size of the mobile containers to be connected.

In an exemplary embodiment where two 20' mobile containers are connected, the mobile containers comprise two holes distributed along the connection faces of the base panels of the two mobile containers, and two pins are inserted into the holes during connection.

Further, the pin 400 may be telescopic, and then the pin will be in a retracted state when a mobile container is to be removed from the system and will be in an expanded state when a mobile container is connected or being connected to the system. When the pin is in its retracted state it will not protrude outside the frame of the mobile container that it has been inserted in to.

Figure 14:
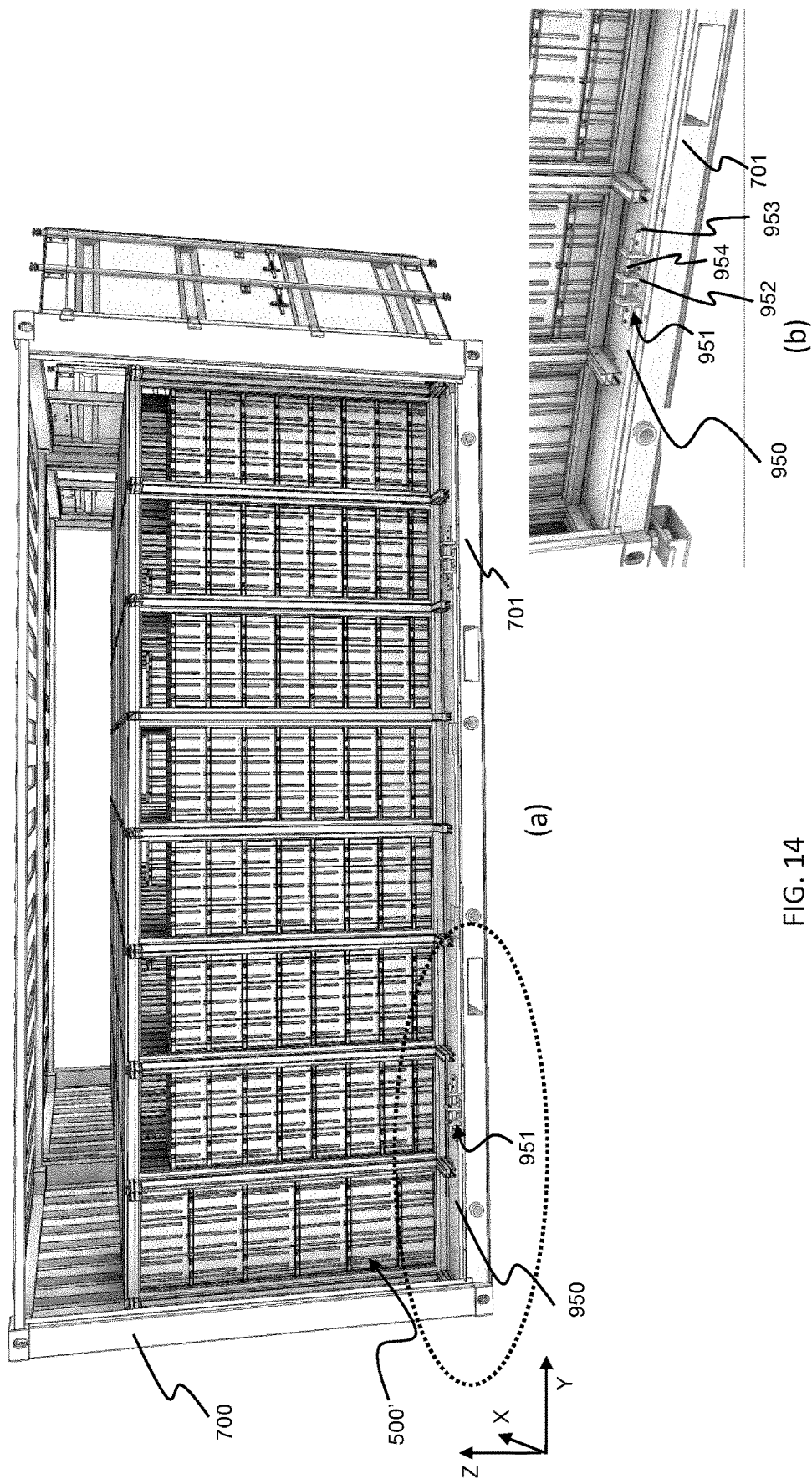
FIG. 14(*a*) is side view of a second mobile container comprising a base plate.

FIG. 14(a) illustrate a second mobile container 700 having a second storage and retrieval structure 500' arranged on top of a base plate 950. The base plate 950 is arranged on top of the base panel 701 of the second mobile container 700. Due to the high degree of accuracy needed when connecting two automated storage and retrieval systems, the base plate 950 is horizontally displaceable, thereby allowing horizontal displacement of the automated storage and retrieval structure arranged thereon. The base plate 950 can e.g. be made of fiber board, hard board or the like, and may be from 10 to 100 mm thick, for example 25 or 30 mm thick.

FIG. 14(b) shows a detailed view of the circled area in FIG. 14(a). FIG. 14(b) illustrates how the base plate 950 can be horizontally displaced in the Y-direction by using one or more adjustment devices 951. The adjustment device 951 is rigidly fixed to the base panel 700 and the base plate 950 using brackets 952, 953.

The adjustment device 951 may, as shown in FIG. 14(b), comprise a mid-bracket 952 connected to the upper surface of the base panel 701, and two side-brackets 953, connected to the base plate 950 arranged on each side of the mid-bracket 952. A bar 954 is passed through holes in each of the three brackets, such that the bar is displaceable in the horizontal Y-direction, restricting movements in the Z-direction and X-direction. By this arrangement the bar 954 can be displaced by loosening and fastening fixtures (for example nuts) which are attached in this case to a threaded bar 954 and on both sides of the mid-bracket 952 on one side of the side-brackets 953. The nuts attached to the bar, mid-bracket 952 and side-brackets 953 may also rigidly fix the bar 954 in a desirable position thereby rigidly fixing the base plate 950 to the base panel 701. When displacing the bar 954, the base plate 950 will be displaced accordingly allowing fine adjustment in the Y-direction of the automated storage and retrieval structure 500' placed thereon.

A similar adjustment device 951 may be provided on the opposite side of the base plate 950, in which case the two adjustment devices 951 can be adjusted in tandem.

Alternatively, one or more adjustment devices 951 may be provided on the adjacent sides to allow horizontal movement in the X-direction.

Thus, the base plate 950 may be provided with one or more adjustment devices 951 allowing horizontal movement in the X and/or Y directions.

Figure 15:
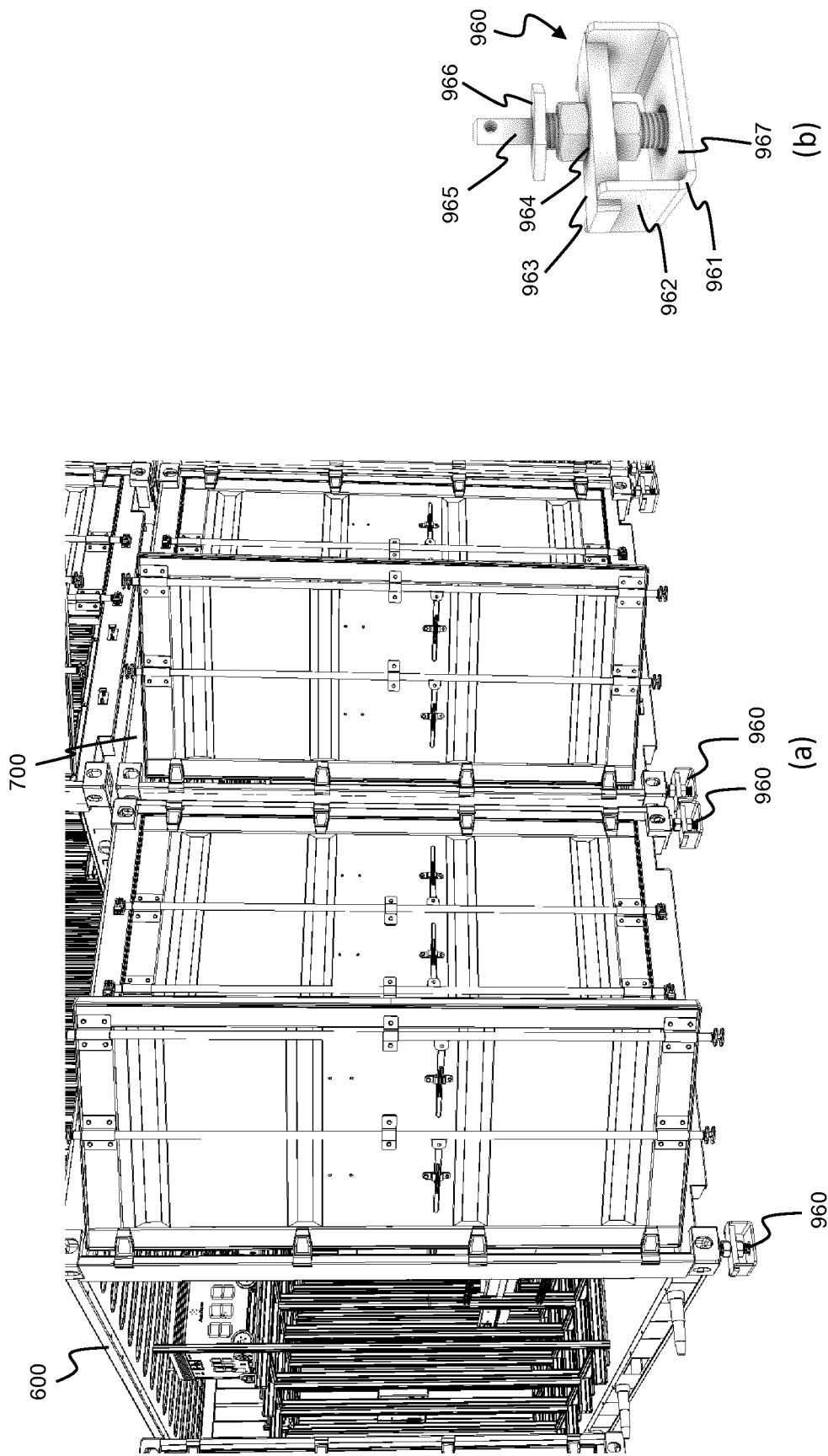
FIG. 15(*a*) is a side view of two connected second mobile containers standing on height adjustment feet.

FIG. 15(a) illustrates a first and second mobile container arranged on height adjustable feet 960. The feet 960 are placed at the lower surface of the base panel 601, 701 of the first and second mobile container 600, 700 at each corner thereof, allowing leveling of the first mobile container 600 and the second mobile container 700 providing and substantially flush lower surfaces between base panels 601, 701 of the first and second mobile containers 600, 700.

FIG. 15(b) shows a detailed view of the exemplary height adjustable foot 960 shown in FIG. 15(a). The foot 960 comprises a bracket 961 comprising a lower base 967 for standing/resting on the ground. The bracket comprises at least two side walls 962 vertically extending from opposite sides of the base 967, and the at least two side walls 962 are interconnected by a bridge 963 comprising a hole 964 in its center. A bar 965 is arranged inside the hole 964 of the bridge 963 and is displaceable in the vertical Z-direction, restricting movements in the horizontal X and Y-directions. The bar 965 has a resting plate 966 arranged above the bridge 963 allowing the mobile container to rest thereon. By this arrangement the bar 954 can be displaced by loosening and fastening fixtures (for example nuts) which are attached in this case to a threaded bar 954 and both sides of the bridge 963 of the bracket 961. As shown the bar may pass through a hole arranged at the center of the base 967 of the bracket 961. Further, the bar 965 may be fixed to the mobile container at its upper end by for example welding or using attaching means.

When displacing the bar 964, the part of the mobile container arranged on the foot 960 will be displaced accordingly, allowing fine adjustment in the Z-direction of the mobile container.

When arranging a plurality of mobile containers in a side-by-side arrangement and placing height adjustable feet under every corner of the base plate of each mobile container, the mobile containers can all be arranged such the outer surfaces of the base panels of the two mobile containers connecting to each other are flush with one another during connection and after being connected.

Whilst the height adjustable feet have been described as being placed under every corner of the base plate of each mobile container, they may additionally be provided at other locations around the bottom perimeter of the base plate of each mobile container.

Figure 16:
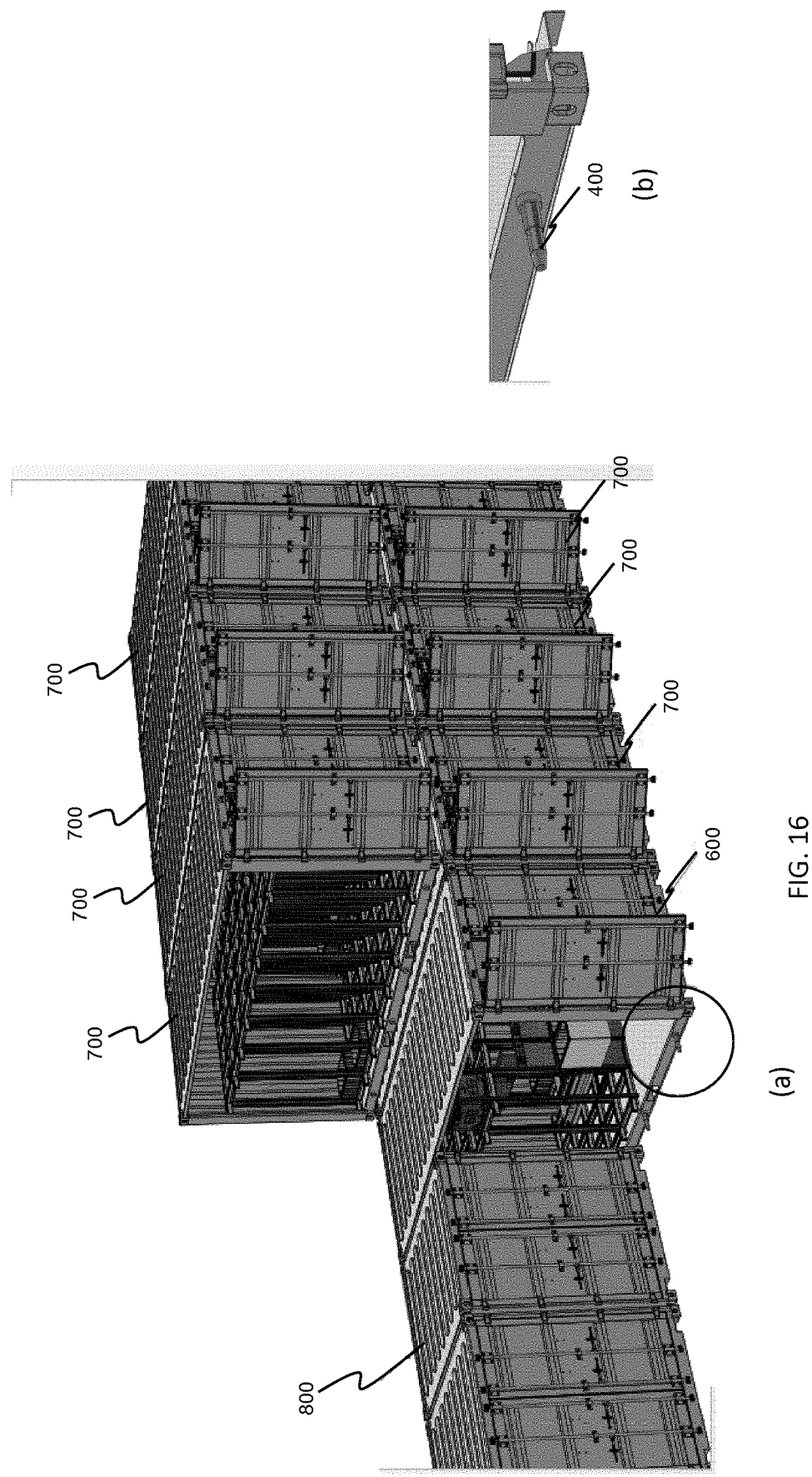
FIG. 16(*a*) is a perspective view of a mobile storage system.

FIG. 16(a) illustrates a perspective view of a mobile storage system where supply containers 700 are arranged on top of other supply containers 700. As illustrated in FIG. 16(a) the mobile storage system may comprise a first row of a plurality of mobile containers arranged in a side-by-side arrangement and a plurality of mobile containers arranged in a side-by-side arrangement in a second row located on top of the first row.

FIG. 16(b) is a detailed view of the pin 400 shown in FIG. 13.

Figure 17:
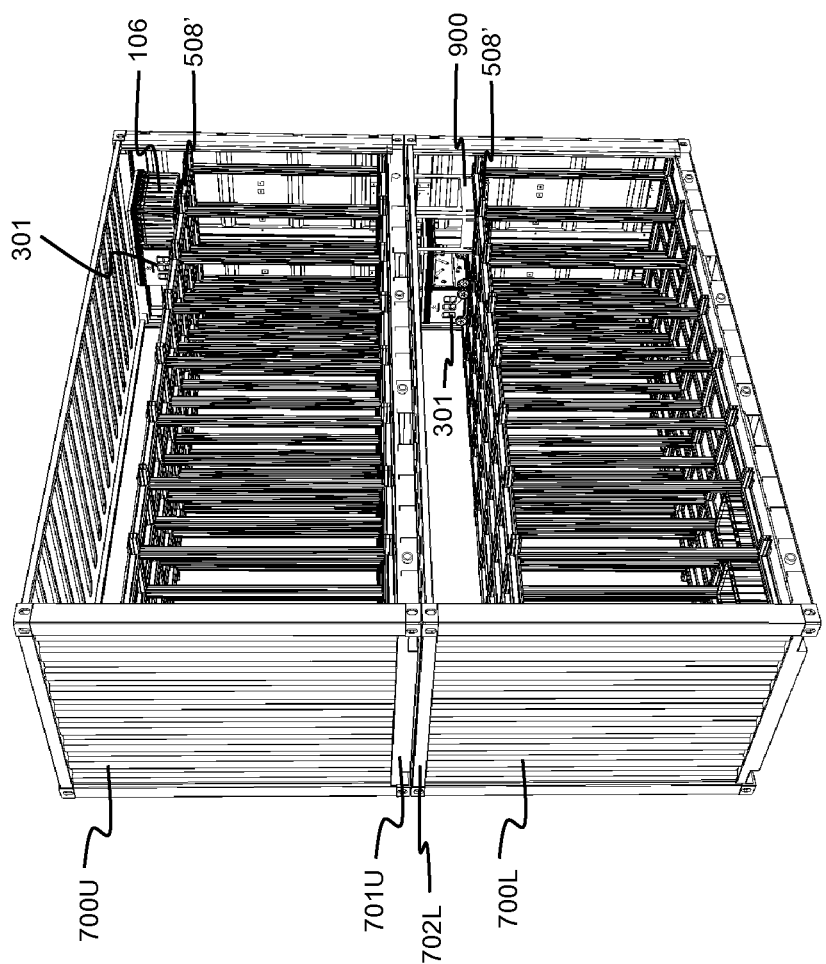
FIG. 17 is a perspective view of two second mobile containers arranged on top of each other.

FIG. 17 shows two mobile containers arranged on top of each other. The upper mobile container is a second mobile container 700 (a supply container), while the lower mobile container can be a first (master) or second (supply) mobile container, however the figure shows two second mobile containers arranged on top of each other.

FIG. 17 illustrates that one upper second mobile container 700U is arranged directly above another lower second mobile container 700L, such that the corners of the base panel 701U of the upper second mobile container 700U are arranged directly above the corresponding corners of the top panel 702L of the lower second mobile container 700L. To allow a storage bin 106 to be moved between the upper and lower second mobile container 700U, 700L, the base panel 701U of the upper second mobile container 700U has a storage bin opening (910, see FIG. 18a) allowing the storage bin 106 to pass therethrough and the top panel 702L of the lower second mobile container 700L may then have a corresponding storage bin opening (910, see FIG. 18a) for the same purpose. A bin handling vehicle 201, 301 arranged on the rail system in the upper second mobile container 700U can use the lifting device within the bin handling vehicle 201, 301 to lower the storage bin 106 from the upper second mobile container 700U passing through the storage bin openings into the lower second mobile container 700L.

A storage bin handling arrangement 900 is arranged in connection with the rail system 508' within the lower second mobile container 700L. An exemplary operation of moving a storage bin 106 between the upper and lower second mobile container 700U, 700L will be explained in detail in FIGS. 18 and 19.

FIGS. 18(a) and (b) illustrate a part of the upper second mobile container 700U arranged on top of the lower second mobile container 700L as shown in FIG. 17.

FIG. 18(a) further illustrates a storage bin 106 attached to a lifting system on a cantilever bin handling vehicle 301. The lifting system has an attachment structure 302 (see FIG. 19) connected to the bin handling vehicle 301 by means of adjustable wires or belts (not shown). The attachment structure 302 is provided with a set of gripping devices 303 adapted to engage the storage bin 106 and means for controlling each gripping device 303. The gripping devices 303 of the lifting system are connected to the bin handling vehicle 301 and ensure vertical transportation of storage bins 106, e.g. raising a storage bin 106 from, and lowering a storage bin 106 into, a storage column.

The attachment structure 302 having the gripping devices 303 can be lowered from the bin handling vehicle 301 so that the position of the gripping devices 303 with respect to the bin handling vehicle 301 can be adjusted in a third direction Z which is orthogonal to the first direction X and the second direction Y.

FIG. 18(b) illustrates the bin handling vehicle 301 having lowered the attachment structure 302 and the storage bin 106 connected thereto into the storage bin openings 910.

FIG. 18(c) illustrates the storage bin handling arrangement 900 arranged on top of the rail system 508' of the lower second mobile container. The storage bin handling arrangement 900 receives and/or delivers the storage bin from and/or to the upper second mobile container, respectively. The storage bin handling arrangement 900 comprises vertically extending barriers 901, for guiding the storage bin in the vertical direction between the storage bin openings 910 and the rail system 508' of the lower mobile container. The bin handling arrangement 900 further comprises a bin moving structure 902, such as a bin conveyor 902, for moving the bin to and/or from the bin handling arrangement to a bin lifting position 903 on the rail system 508' in the lower second mobile container where the storage bin can be picked up or delivered by a bin handling vehicle. Thus, the bin conveyor 902 transports the storage bin horizontally between the bin handling arrangement 900 and the bin lifting position 903 within the rail system 508' of the lower second mobile container. When the storage bin is arranged in the bin lifting position 903, the bin handling vehicle can pick the storage bin up and move it to a target position within the storage grid structure of the lower second mobile container 700L. The bin handling vehicle may also deliver the storage bin to the bin lifting position for the storage bin to be moved to the position inside the storage bin handling arrangement 900, for the storage bin to be picked up by the gripping devices connected to a bin handling vehicle arranged in the upper second mobile container 700U and thereafter moving the bin handling vehicle comprising the storage bin to a target position for the storage bin within the storage grid structure of the upper second mobile container.

The bin conveyor 902 shown in FIG. 18(c) has a conveyor belt 904 having a bin resting arrangement 905 attached thereto. The bin resting arrangement 905 can be any kind of arrangement allowing the storage bin to be moved in the horizontal direction from its position adjacent to the storage bin handling arrangement 900 to the bin lifting position 903.

FIG. 19(a) to (e) illustrate an exemplary process where the storage bin handling arrangement 900, which is located on top of the rail system 508' of the lower second mobile container 700L receives a storage bin 106 from a bin handling vehicle 301 located on the rail system 508' of the upper mobile container 700U, and how the storage bin 106 is removed from the position adjacent to the storage bin handling arrangement 900 to the bin lifting position 903 where another bin handling vehicle 301 arranged on top of the rail system 508' of the lower second mobile container 700L can pick up the storage bin.

In FIG. 19(a) the storage bin handling arrangement 900 is empty and ready to receive a storage bin.

FIG. 19(b) illustrates a storage bin 106 situated adjacent to the bin handling arrangement 900 after the storage bin has been delivered from the bin handling vehicle arranged in the upper second mobile container 700U, see FIG. 17. The attachment structure 302 of the bin handling vehicle is still connected to the storage bin 106.

FIG. 19(c) illustrates the attachment structure 302 comprising the gripping device 303 after having released the storage bin 106 therefrom. The storage bin 106 is placed on the resting arrangement 905 of the bin conveyor 902 positioned at the storage bin handling arrangement 900.

FIG. 19(d) illustrates the storage bin arranged at the bin lifting position 903 after being conveyed by the conveyor belt 904 of the conveyor 902 from the position adjacent to the bin handling arrangement 900 to the bin lifting position 903.

FIG. 19(e) illustrates how the bin handling vehicle 301 can pick up the storage bin 106 from the bin lifting position 903.

Figure 18:
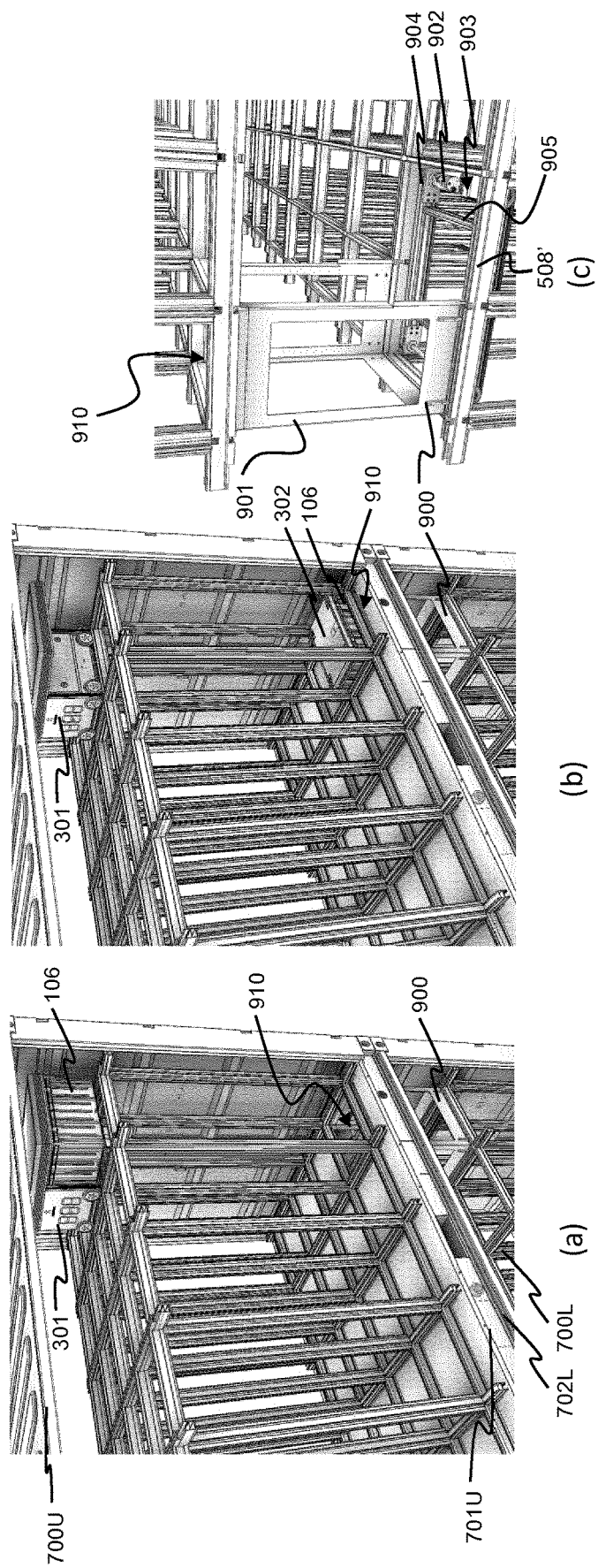
FIGS. 18(*a*) and (*b*) are close up views of parts of FIG. 17.
Figure 19:
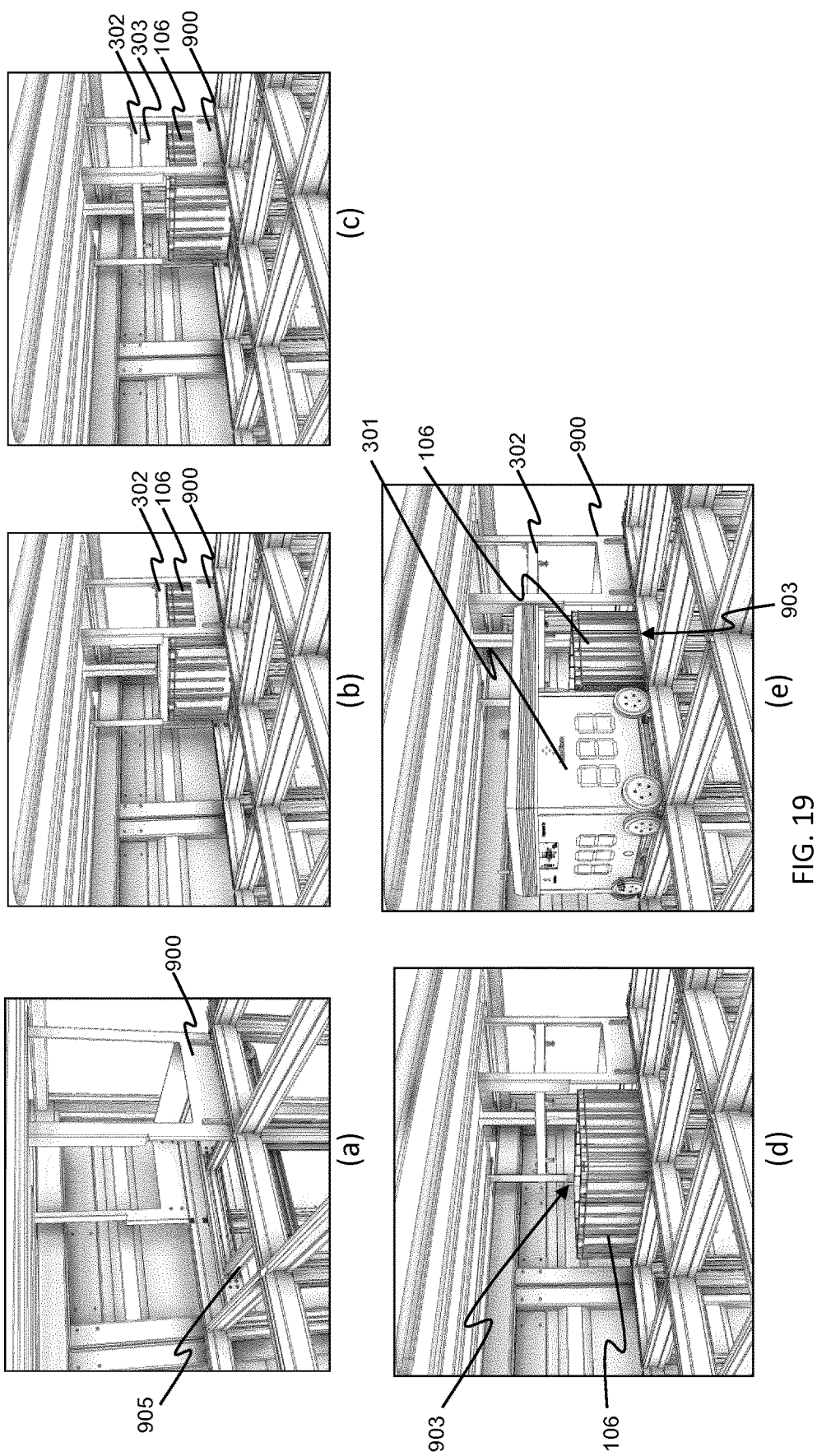
FIG. 19(*a*) to (*e*) are detailed views of storage bin handling arrangement and a bin conveyor in different operational settings.

Whilst FIGS. 18 and 19 illustrate a cantilever bin handling vehicle, a single cell bin handling vehicle 201 can of course be used for the same purpose.

Figure 20:
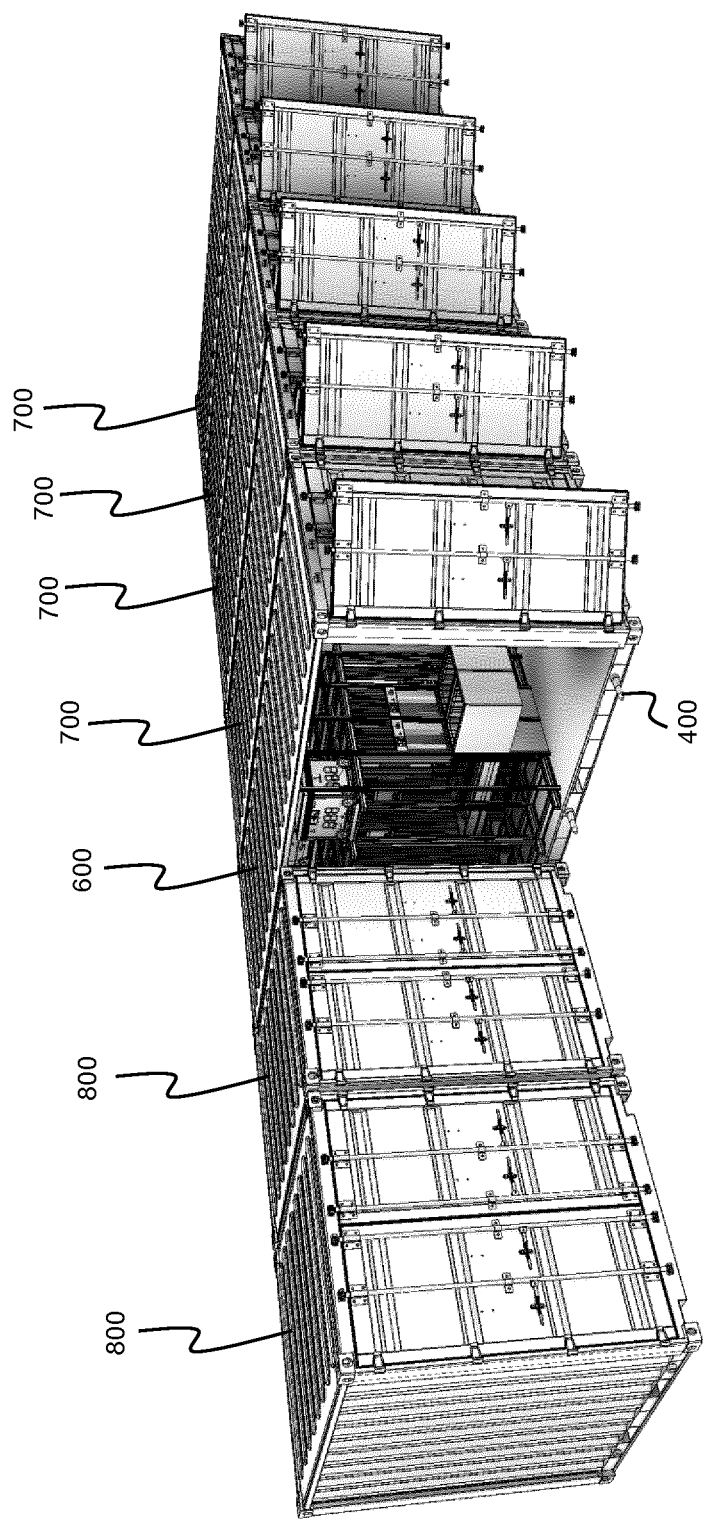
FIG. 20 is a perspective view of a mobile storage system comprising equipment containers.

FIG. 20 illustrates a mobile storage system having the first mobile container 600 (master container) and four second mobile containers 700 (supply containers) connected in a side-by-side arrangement where the system includes two equipment containers 800 for storing equipment such as air conditioning systems, generators, fire-extinguishing systems. The equipment container 800 is connected to the first mobile container 600 at the opposite side of the connection with the second mobile container 700.

As can be seen from the drawings of the exemplary mobile storage systems, the mobile storage systems provide for a flexible system where a mobile container arranged at any end of the side-by-side arrangement can be replaced by another mobile container. For example, by looking at a system comprising one master container and four supply containers arranged in a side-by-side arrangement as shown in FIG. 12, the grid structure of the master container and the supply containers can be considered to all be full storage bins comprising goods. As the operational time of the system passes, more and more items are removed from the bins within the system. If the system then operates in such a manner that all the empty storage bins are positioned within the supply container arranged at the end of the side-by-side arrangement by either replacing storage bins comprising goods or by occupying a free space for the empty storage bin to be arranged, then as the operational time passes, the supply container receiving all the empty storage bins will be full of empty storage bins. The supply container can then be removed and replaced by another supply container having storage bins with goods.

REFERENCE NUMERALS

1 Storage and retrieval system (prior art)
100 Framework structure
102 Upright members/vertical members of framework structure
103 Horizontal members of framework structure
104 Storage grid structure
105 Storage column
106 Storage bin
106' Particular position of storage bin
107 Stack
108 Rail system/track system
110 Parallel rails in first direction (X)
110a First rail of neighboring rails 110
110b Second rail of neighboring rails 110
111 Parallel rails in second direction (Y)
111a First rail of neighboring rails 111
111b Second rail of neighboring rails 111
112 Grid column
115 Grid opening
119 First port column/first port
120 Second port column/second port
122 Grid cell/storage cell
201 Prior art single cell bin handling vehicle
201a Vehicle body of the bin handling vehicle 201
201b Drive means/wheel arrangement, first direction (X)
201c Drive means/wheel arrangement, second direction (Y)
301 Prior art cantilever bin handling vehicle
301a Vehicle body of the bin handling vehicle 301
301b Drive means in first direction (X)
301c Drive means in second direction (Y)
302 Attachment structure
303 Gripping/engaging device
400 Coupling device/Connecting pin
401 Hole
450 Intermediate element/intermediate connection element
451 First end of intermediate element
452 Second end of intermediate element
460 Pivot connection arrangement
500 First storage and retrieval system of the mobile container
500' Second storage and retrieval system of the second mobile container
502 Vertical members of the first storage and retrieval system
502' Vertical members of the second storage and retrieval system
504 First storage grid structure of the first storage and retrieval system
504' Second storage grid structure of the second storage and retrieval system
505 Storage column of the first storage and retrieval system
505' Storage column of the second storage and retrieval system
508 First rail system of the first storage and retrieval system
508' Second rail system of the second storage and retrieval system
508'a First track
508'b Second track
509 Access station
512 Column
550 Charging station
600 First mobile container/master container
600' First container frame of first mobile container
601 Base panel/floor of first mobile container
602 Top panel/roof of first mobile container
603 Short end side panel of first mobile container
604 Long end side panel of first mobile container
605 Door of first mobile container
606 Vertically extending profile of first mobile container
700 Second mobile container/Supply container
700' Second container frame of second mobile container
700U Upper second mobile container
700L Lower second mobile container
701 Base panel/floor of second mobile container
701U Base panel/floor of upper second mobile container
702 Top panel/roof of second mobile container
702L Top panel/roof of lower second mobile container
703 Short end side panel of second mobile container
704 Long end side panel of second mobile container
705 Door of second mobile container
706 Vertically extending profile of second mobile container
800 Equipment container 900 Storage bin handling arrangement
901 Barrier
902 Conveyor
903 Bin lifting position
904 Conveyor belt/belt
905 Bin resting arrangement
910 Storage bin openings
950 Base plate
951 Adjustment device
952 Mid-bracket
953 Side-bracket
954 Bar of adjustment device
960 Height adjustable foot/foot
961 Bracket
962 Side walls of bracket 961
963 Bridge
964 Hole in bridge 963
965 Bar of foot
966 Resting plate
967 Base of bracket 961
X First direction
Y Second direction
Z Third direction

The invention claimed is:

1. A mobile storage system comprising:
a first mobile container comprising a removable side panel; and
a first automated storage and retrieval system arranged inside the first mobile container,
wherein the first automated storage and retrieval system comprises:
a first storage grid structure having vertical members defining multiple storage columns for storing storage bins on top of each other in vertical stacks, wherein the vertical members are interconnected at their upper ends by a first rail system arranged to guide at least one bin handling vehicle thereon, and
an intermediate element disposed on the first rail system configured to directly connect to a second rail system of a second storage grid structure arranged inside a second mobile container,
wherein the intermediate element is configured to connect the first rail system and the second rail system through the removable side panel,
wherein the intermediate element is configured to convey the bin handling vehicle, whether carrying or not carrying a storage bin, between the first rail system and the second rail system,
the bin handling vehicle being configured to raise storage bins from, and lower storage bins into, the storage columns, and to transport the storage bins above the storage columns.

2. The system according to claim 1, wherein the first mobile container comprises a first container frame, the first container frame comprising:
a base panel,
a top panel, and
four vertically extending profiles extending from each corner of the base panel to connect the base panel and the top panel.

3. The system according to claim 2, wherein the first container frame further comprises two long end side panels and two short end side panels, wherein the removable side panel comprises at least a part of at least one of the two long end side panels and two short side panels.

4. The system according to claim 2, wherein the first container frame further comprises two long end side panels and two short end side panels, and wherein the removable side panel comprises at least a part of one long end side panel.

5. The system according to claim 2, wherein the first container frame further comprises two long end side panels and two short end side panels, wherein the removable side panel comprises at least one of the long end side panels.

6. The system according to claim 1, wherein the first automated storage and retrieval system further comprises at least one column dedicated for drop off and/or pick of storage bins by the bin handling vehicle and an access station where the storage bins can be accessed from outside of the first storage grid structure or transferred out of or into the at least one column of the first storage grid structure dedicated for drop off and/or pick of storage bins.

7. The system according to claim 1, wherein the first automated storage and retrieval system further comprises a charging station for charging the bin handling vehicle, said charging station being arranged at or on one of the first rail system or the second rail system.

8. The system according to claim 1, wherein the first automated storage and retrieval system further comprises a controller for storing, receiving and/or transferring data regarding items stored in the storage bins and a position of the storage bins.

9. The system according to claim 1, wherein the first mobile container comprises height adjustable feet fixed to an outer lower surface of the first mobile container, thereby allowing height adjustment and/or leveling of the first mobile container.

10. The system according to claim 2, further comprising the second mobile container configured to removably connect to the first mobile container, wherein a second automated storage and retrieval system is arranged within the second mobile container, wherein the second automated storage and retrieval system comprises:
the second storage grid structure having vertical members defining multiple storage columns for storing storage bins on top of each other in vertical stacks, wherein the vertical members are interconnected at their upper ends by the second rail system arranged to guide at least one bin handling vehicle thereon,
the bin handling vehicle being configured to raise storage bins from, and lower storage bins into the storage columns, and to transport the storage bins above the storage columns.

11. The system according to claim 10, wherein the second mobile container comprises a second container frame, the second container frame comprising:
a base panel,
a top panel, and
four vertically extending profiles extending from each corner of the base panel to connect the base panel and the top panel.

12. The system according to claim 11, wherein the second container frame further comprises two long end side panels and two short end side panels, wherein at least a part of one of the side panels is removable.

13. The system according to claim 11, wherein the second container frame further comprises two long end side panels and two short end side panels, wherein at least a part of one of the long end side panels is removable.

14. The system according to claim 11, wherein the second container frame further comprises two long end side panels and two short end side panels, wherein at least one of the long end side panels is removable.

15. The system according to claim 11, wherein the second mobile container comprises a controller for storing, receiving and/or transferring data regarding items stored in the storage bins and a position of the storage bins of the second mobile container.

16. The system according to claim 11, wherein at least one of the first storage grid structure and the second storage grid structure is arranged on a horizontally displaceable base plate configured to allow horizontal displacement.

17. The system according to claim 11, wherein the second mobile container comprises height adjustable feet fixed to an outer lower surface of the second mobile container, thereby allowing height adjustment and/or leveling of the second mobile container.

18. The system according to claim 11, wherein the first container frame and the second container frame are connected by a coupling device allowing the first container frame and the second container frame to be aligned.

19. The system according to claim 11, wherein a vertical extent of at least one of a base panel, top panel and vertically extending profiles of the first mobile container comprises at least one hole facing at least one corresponding hole arranged in a vertical extent of at least one of a base panel, top panel and vertically extending profiles of the second mobile container for inserting a connecting pin between the first mobile container and the second mobile container for aligning the two containers in at least one of a vertical position and horizontal position.

20. The system according to claim 19, wherein the connecting pin is telescopic such that the connecting pin occupies in a retracted state the hole in either the first mobile container frame or the hole in the second mobile container frame.

21. The system according to claim 11, wherein the first rail system is connected to the second rail system via the intermediate element.

22. The system according to claim 11, wherein the second mobile container is arranged on top of the first mobile container, wherein a base panel of the second mobile container has an opening corresponding to an opening in a top panel of the first mobile container, and wherein the openings allow a storage bin to move between the second mobile container and the first mobile container.

23. The system according to claim 11, wherein the system comprises a plurality of second mobile containers aligned adjacent to each other.

24. The system according to claim 23, wherein one second mobile container is arranged on top of another second mobile container.

25. The system according to claim 24, wherein the at least two second mobile containers have corresponding openings to allow a storage bin to move between the two second mobile containers.

26. The system according to claim 1, wherein the system further comprises an equipment container for storing equipment such as air conditioning systems, generators, fire-extinguishing systems.

27. A method of providing a mobile storage system comprising:
providing a first mobile container comprising a removable side panel;
arranging a first automated storage and retrieval system inside the first mobile container; and
transporting the first mobile container with the first automated storage and retrieval system inside to a location for use,
wherein the first automated storage and retrieval system comprises:
a first storage grid structure having vertical members defining multiple storage columns for storing storage bins on top of each other in vertical stacks, wherein the vertical members are interconnected at their upper ends by a first rail system arranged to guide at least one bin handling vehicle thereon, and
an intermediate element disposed on the first rail system configured to directly connect to a second rail system of a second storage grid structure arranged inside a second mobile container,
wherein the intermediate element is configured to connect the first rail system and the second rail system through the removable side panel,
wherein the intermediate element is configured to convey the bin handling vehicle, whether carrying or not carrying a storage bin, between the first rail system and the second rail system,
the bin handling vehicle being configured to raise storage bins from, and lower storage bins into, the storage columns, and to transport the storage bins above the storage columns.

28. The method according to claim 27, comprising:
providing the second mobile container;
arranging a second automated storage and retrieval system inside the second mobile container; and
transporting the second mobile container with the second automated storage and retrieval system inside to the location for use; and
connecting the first mobile container and second mobile container together,
wherein the second automated storage and retrieval system comprises:
the second storage grid structure having vertical members defining multiple storage columns for storing storage bins on top of each other in vertical stacks, wherein the vertical members are interconnected at their upper ends by the second rail system arranged to guide at least one bin handling vehicle thereon,
the bin handling vehicle being configured to raise storage bins from, and lower storage bins into the storage columns, and to transport the storage bins above the storage columns.

29. The method according to claim 28, wherein the first mobile container comprises a first container frame, the first container frame comprising:
a base panel,
a top panel, and
four vertically extending profiles extending from each corner of the base panel to connect the base panel and the top panel,
two long end side panels and two short end side panels, wherein the removable side panel comprises at least a part of one of the two long end side panels and two short end side panels,
and wherein the second mobile container comprises a second container frame, the second container frame comprising:
a base panel,
a top panel,
four vertically extending profiles extending from each corner of the base panel to connect the base panel and the top panel, and two long end side panels and two short end side panels, wherein at least a part of one of the side panels is removable, and wherein the method comprises:
- removing the removable side panel thereby creating an opening of the first container frame being at least a size of a cross-section of a bin handling vehicle carrying a bin moving on the first rail system,
- removing the at least one part of one of the side panels of the second container frame thereby creating an opening the second container frame being at least the size of the cross-section of a bin handling vehicle carrying a bin moving on the first rail system,
- arranging the opening of the first container frame in correspondence with the opening of the second container frame, and
- connecting the first rail system with the second rail system by arranging the intermediate element therebetween.

30. The method according to claim 29, wherein step c) of the method further comprises connecting the first container frame with the second container frame by a coupling device allowing the first container frame and the second container frame to be aligned.

31. The method according to claim 28, wherein the method further comprises adjusting, using height adjustable feet, the height and/or horizontal level of the first mobile container or second mobile container with respect to the height of the other mobile container.

* * * * *